(12) United States Patent
Shigihara et al.

(10) Patent No.: US 9,184,905 B2
(45) Date of Patent: Nov. 10, 2015

(54) PHASE COMPENSATION RECEIVER

(75) Inventors: Masahiro Shigihara, Tokyo (JP); Kiyoshi Fukuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/005,238

(22) PCT Filed: Nov. 15, 2011

(86) PCT No.: PCT/JP2011/076741
§ 371 (c)(1),
(2), (4) Date: Sep. 13, 2013

(87) PCT Pub. No.: WO2012/132103
PCT Pub. Date: Oct. 4, 2012

(65) Prior Publication Data
US 2014/0003555 A1    Jan. 2, 2014

(30) Foreign Application Priority Data
Mar. 25, 2011 (JP) ................. 2011-067699

(51) Int. Cl.
H04L 27/14    (2006.01)
H04L 27/22    (2006.01)
H04L 7/00     (2006.01)
H04B 10/61    (2013.01)
H04L 27/227   (2006.01)
H04L 27/00    (2006.01)

(52) U.S. Cl.
CPC .......... H04L 7/0016 (2013.01); H04B 10/6165 (2013.01); H04L 27/2276 (2013.01); *H04L 27/223* (2013.01); *H04L 2027/0048* (2013.01); *H04L 2027/0055* (2013.01); *H04L 2027/0067* (2013.01); *H04L 2027/0095* (2013.01)

(58) Field of Classification Search
CPC .............. H04L 7/0016; H04L 27/2276; H04B 10/6165
USPC ................................... 375/324, 340
See application file for complete search history.

(56) References Cited

U.S. PATENT DOCUMENTS 4,630,286 A * 12/1986 Betts ............................ 375/261
8,102,744 B2    1/2012 Tachino et al.
(Continued)

FOREIGN PATENT DOCUMENTS

| JP | 55-110458 A | 8/1980 |
|----|-------------|--------|
| JP | 2-11047 A   | 1/1990 |
| JP | 3-289844 A  | 12/1991 |

(Continued)

OTHER PUBLICATIONS

Written Opinion of the International Searching Authority (PCT/ISA/237), Feb. 7, 2012 per App. rep.
(Continued)

*Primary Examiner* — Qutbuddin Ghulamali
(74) *Attorney, Agent, or Firm* — McGinn IP Law Group, PLLC.

(57) ABSTRACT

A phase excursion compensation circuit of a phase modulation signal demodulator detects occurrence of a slip of a received signal from a change in a phase compensation amount that is formed into the received signal by a phase excursion compensation unit, and corrects the phase compensation amount of the received signal after the slip is generated.

18 Claims, 29 Drawing Sheets

(56) References Cited

U.S. PATENT DOCUMENTS

| | | | |
|---|---|---|---|
| 8,139,685 B2* | 3/2012 | Simic et al. | 375/324 |
| 2008/0225666 A1 | 9/2008 | Tachino et al. | |

FOREIGN PATENT DOCUMENTS

| JP | 5-103030 A | 4/1993 |
|---|---|---|
| JP | 9-23157 A | 1/1997 |
| JP | 10-229423 A | 8/1998 |
| JP | 11-205399 A | 7/1999 |
| JP | 2002-111766 A | 4/2002 |
| JP | 2008-226363 A | 9/2008 |
| JP | 2009-135844 A | 6/2009 |

OTHER PUBLICATIONS

International Search Report (PCT/ISA/210) dated Feb. 7, 2012.

* cited by examiner

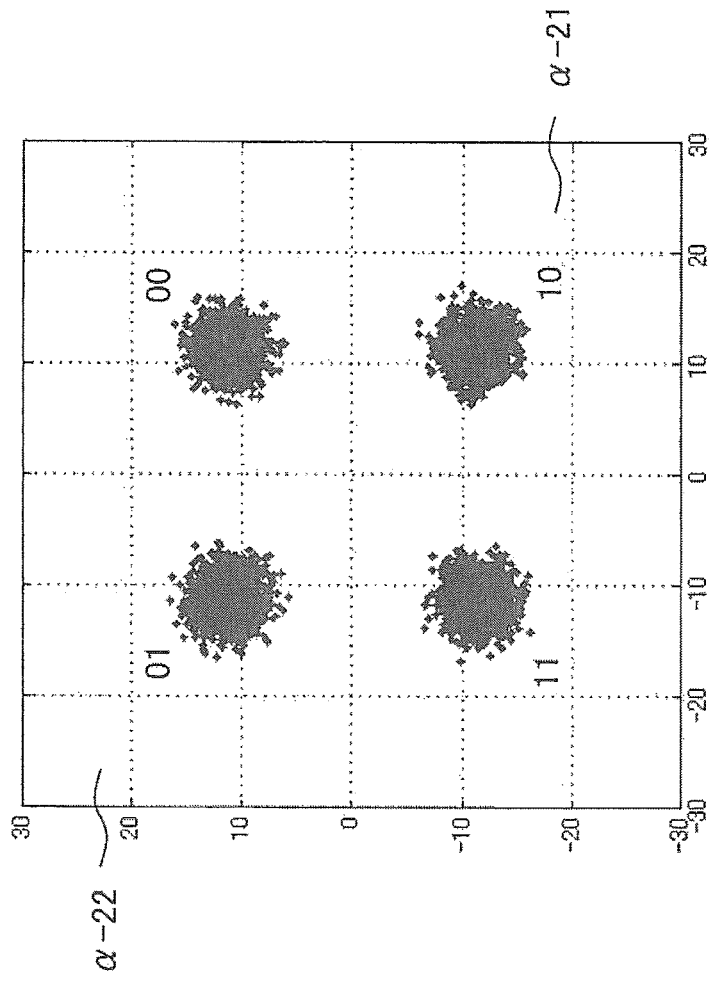

AN EXAMPLE FOR WHICH A CONSTELLATION ROTATED CONTINUOUSLY BY AN OPTICAL CARRIER WAVE FREQUENCY EXCURSION

AN EXAMPLE FOR WHICH A CONSTELLATION BY AN OPTICAL PHASE EXCURSION ROTATED ONLY THE AMOUNT OF THE PHASE EXCURSION

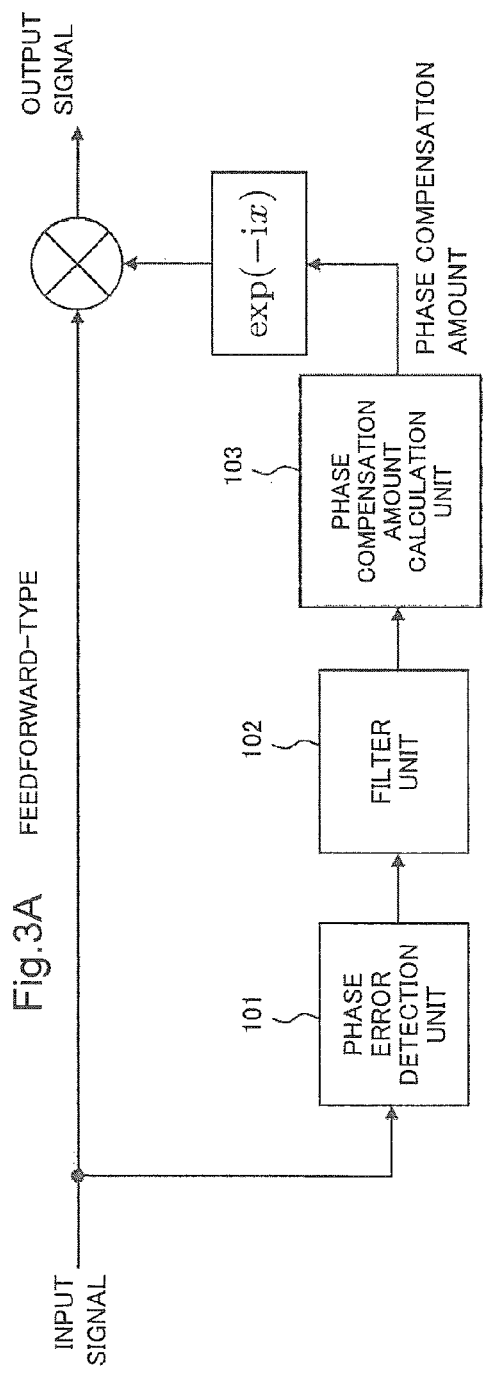
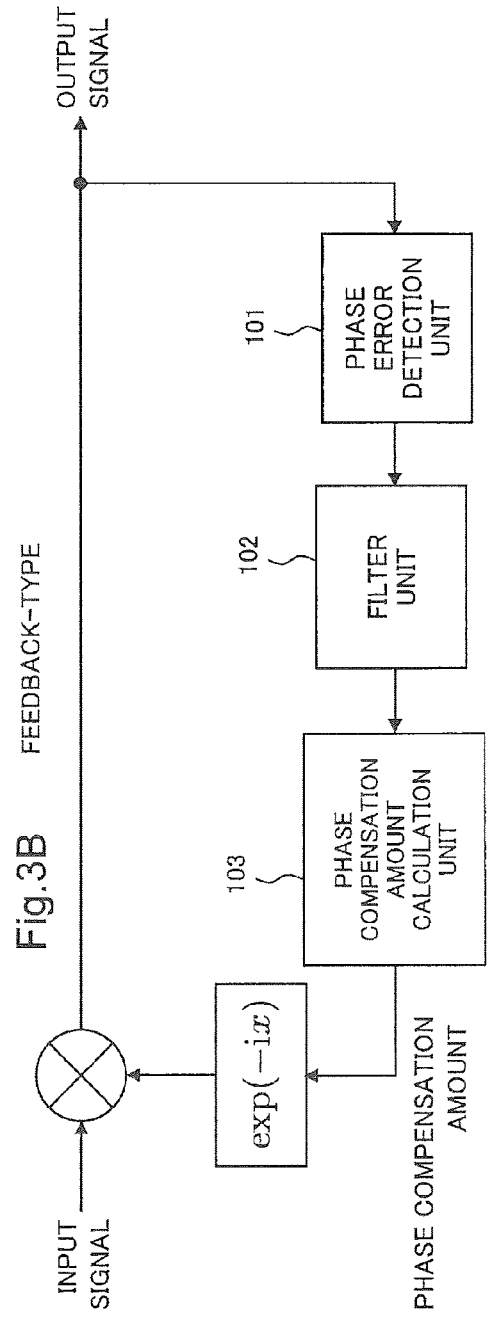
Fig.3A  FEEDFORWARD-TYPE
Fig.3B  FEEDBACK-TYPE

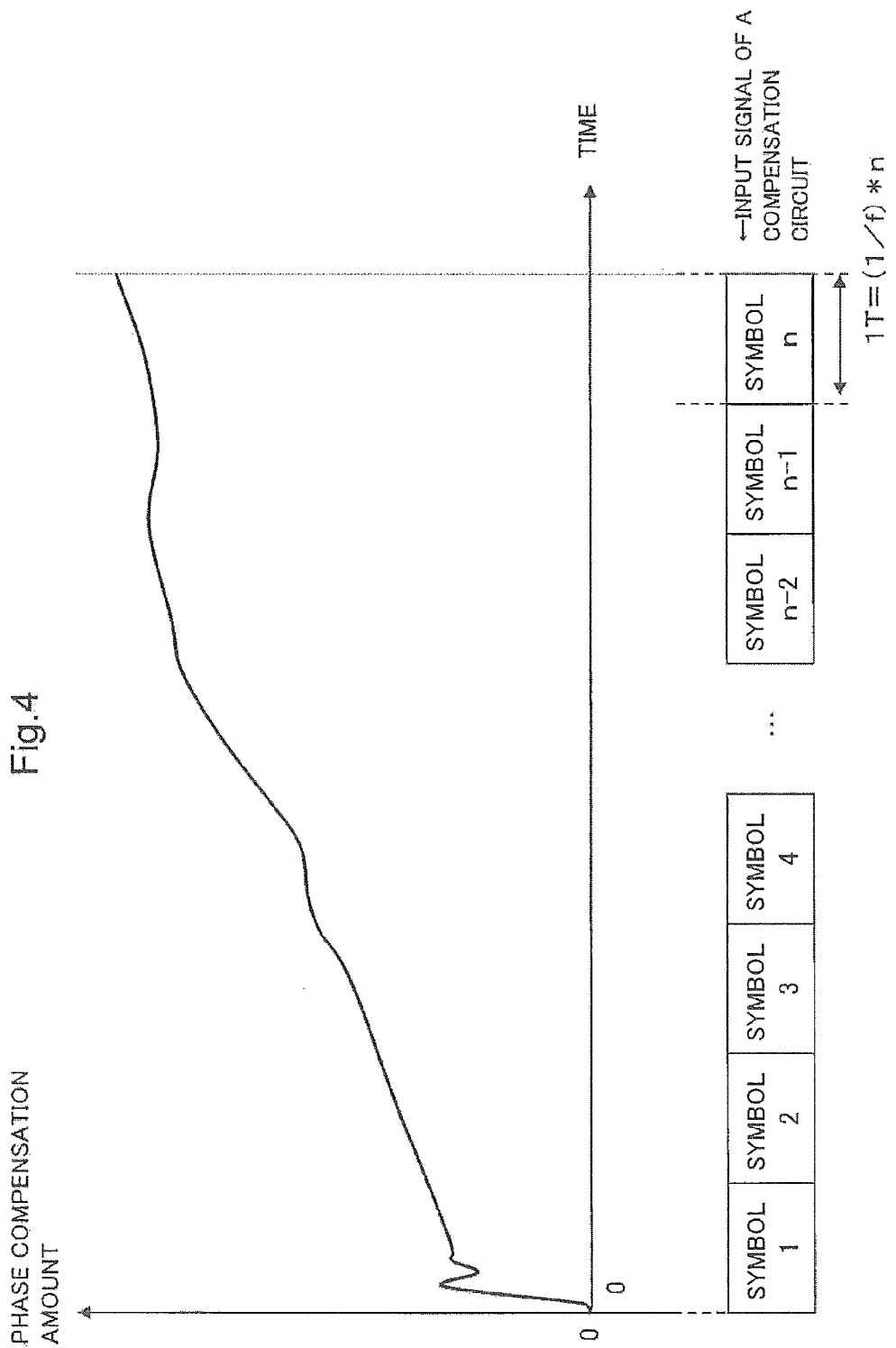

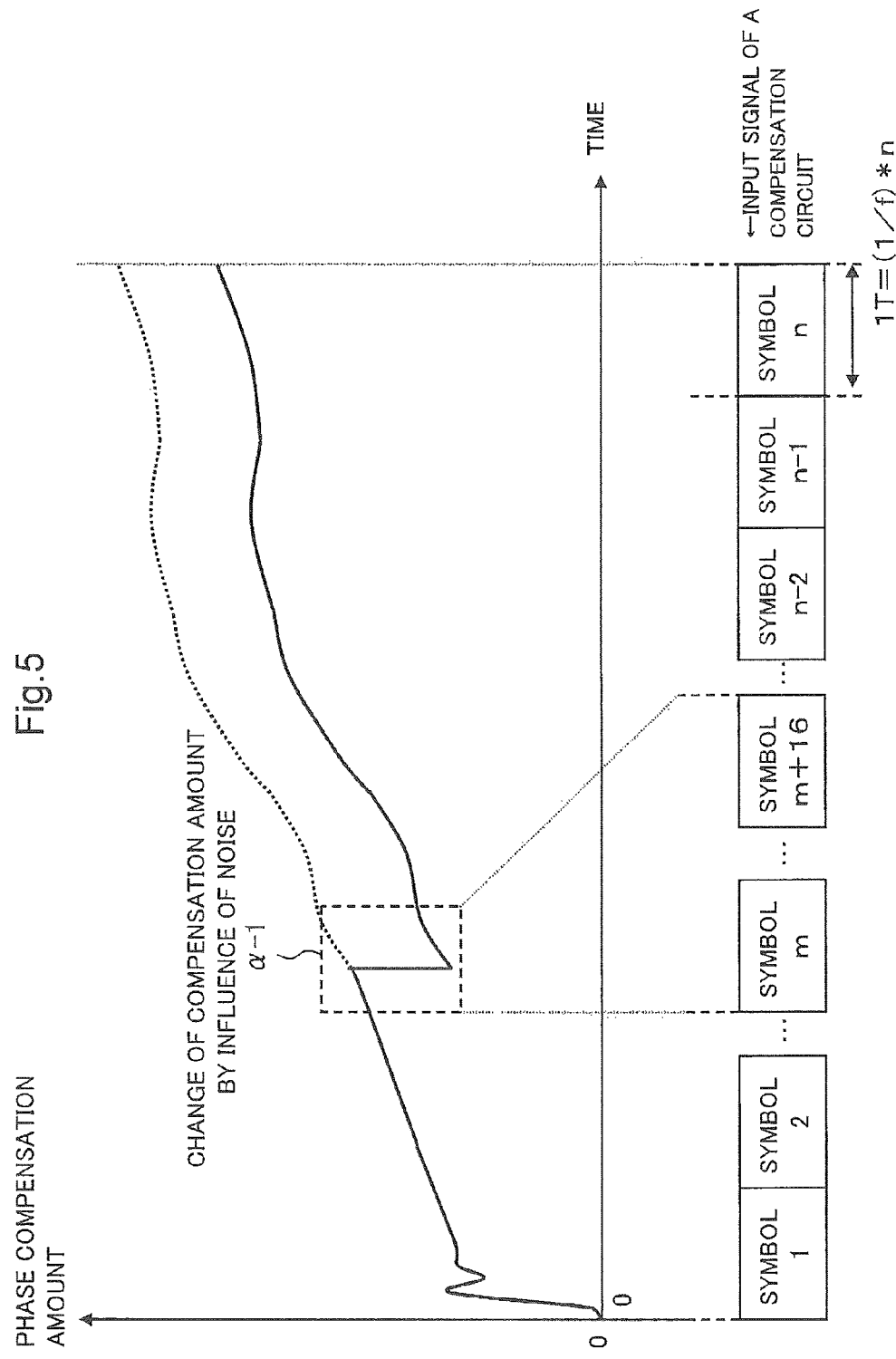

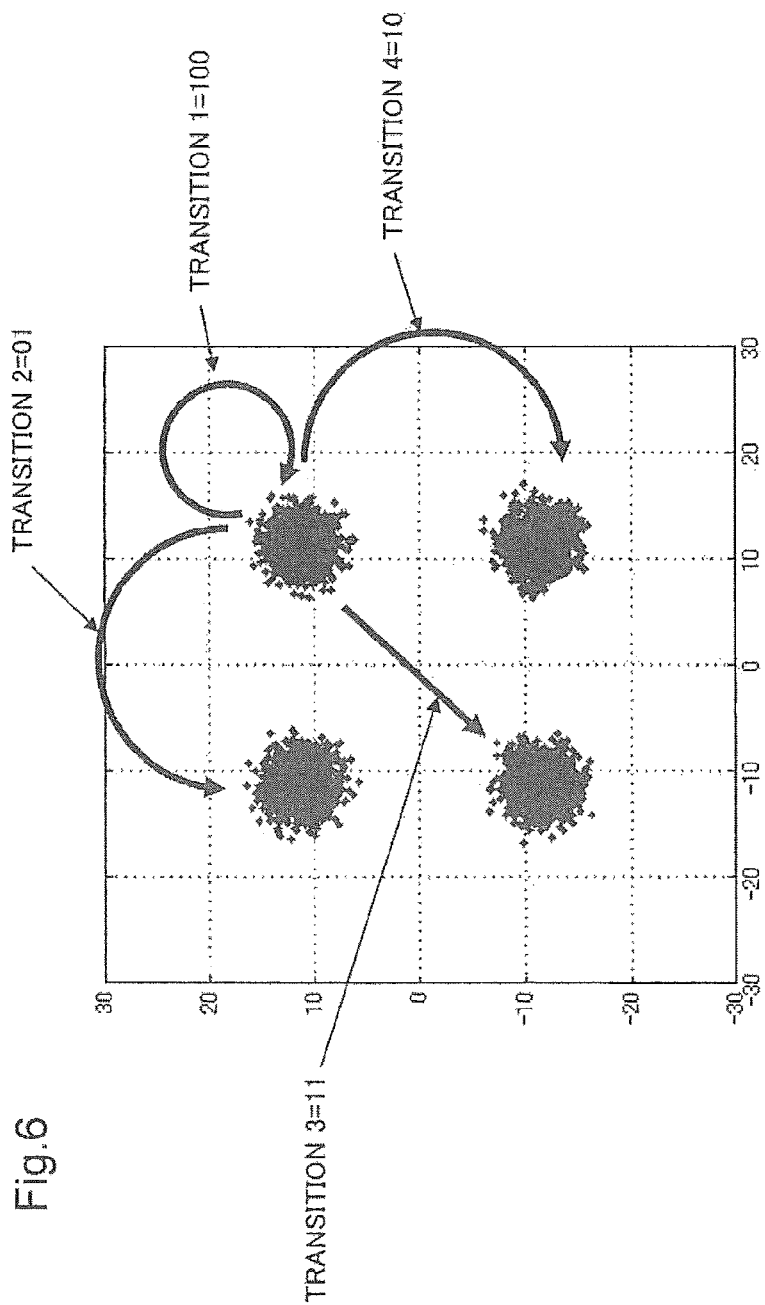

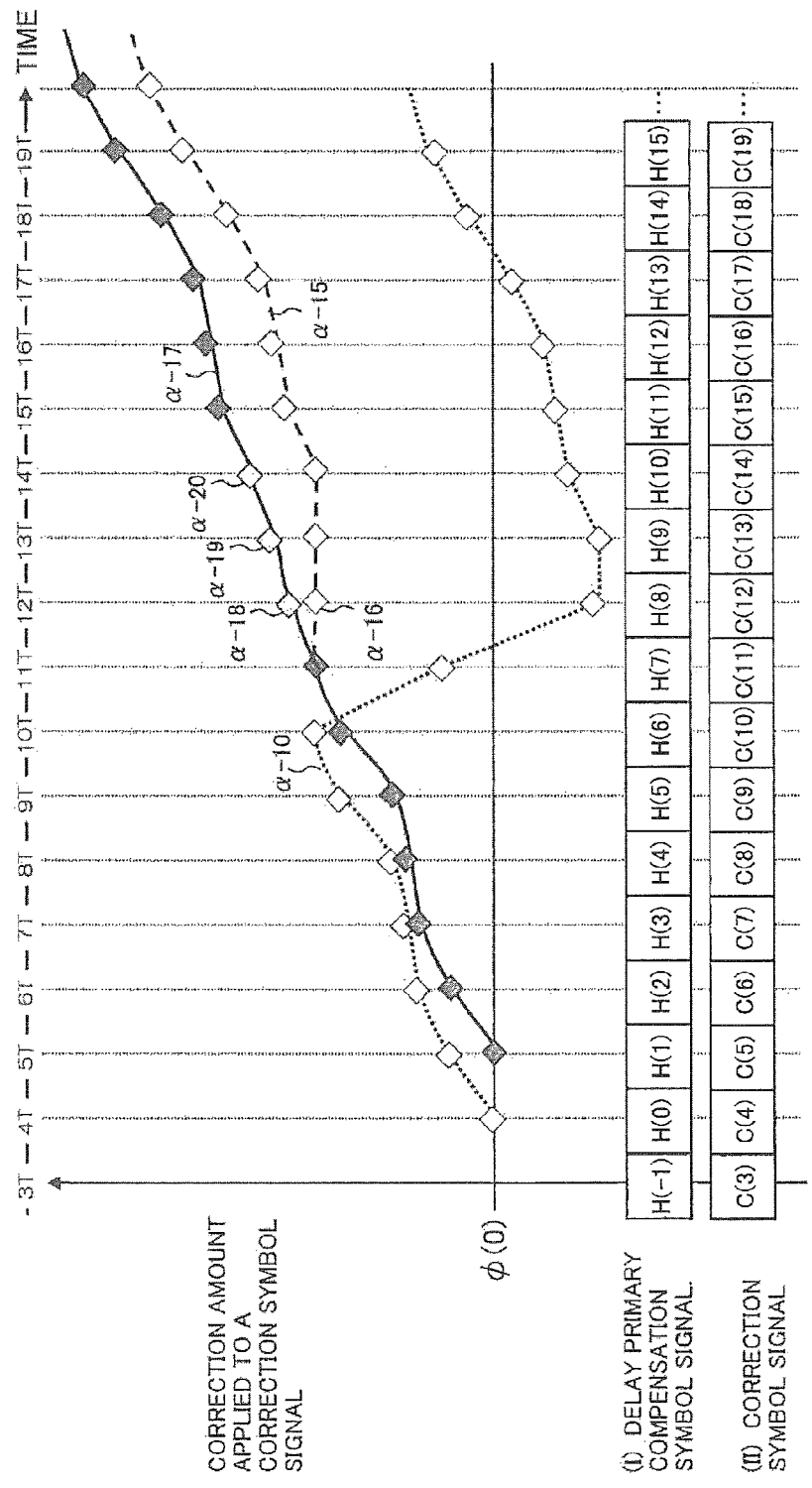

PHASE COMPENSATION RECEIVER

TECHNICAL FIELD

The present invention relates to a receiver which performs compensation of a frequency phase excursion and carrier wave frequency deviation, and in particular, relates to compensation of an optical phase excursion and optical carrier wave frequency deviation at the time of cycle (phase) slip occurrence.

BACKGROUND ART

Since the traffic volume of trunk communication systems has been drastically increasing due to widespread use of the Internet, there are great hopes that a high speed optical communication system in excess of 40 Gbps will be practically implemented.

In recent years, as a technology to realize an ultra-high speed optical communication system, optical phase modulation systems have been attracting much attention. In optical phase modulation systems, data modulation is not performed to an optical intensity of a transmission laser light like a related optical intensity modulation method, but data modulation is performed to a phase of a transmission laser light. As optical phase modulation methods, methods such as QPSK and 8PSK are known. QPSK is an abbreviation for Quadrature Phase Shift Keying, and 8PSK is that for 8 Phase Shift Keying.

The advantage of optical phase modulation methods is as follows. That is, by allocating a plurality of bits to one symbol, it is possible to reduce a symbol rate (baud rate). Accordingly, an operation speed of electrical devices can be reduced. As a result, cutting of device production costs can be expected. For example, if QPSK is used, 2 bits (00, 01, 11 and 10, for example) are allocated to each of four optical phases (45, 135, 225, and 315 degrees, for example). Therefore, the symbol rate in QPSK can be reduced to ½ of the symbol rate (that is, bit rate) in optical intensity modulation methods.

FIG. 1 is a diagram called a constellation of QPSK in which four symbols of QPSK and bit sequences allocated to each symbol are illustrated on a phase plane. Correlating a bit sequence to each symbol in the optical phase modulation system is called symbol mapping. Although the case will be described below where QPSK is used as an optical phase modulation system, other optical phase modulation systems are also applicable.

In order to receive a signal light modulated with optical phase modulation, the signal light and a laser light (which is called a local light) which has the almost same optical frequency as that of the signal light are coupled by an optical element called a 90-degree hybrid. Then, the output of the 90-degree hybrid is received by an optical detector, and is converted to an electrical signal. A system like this is called an optical coherent system.

It is assumed for simplicity that each polarization state of the signal light and the local light is an identical linear polarization. If the optical coherent system is used, an alternating current component of an electrical signal outputted from the optical detector is a beat signal composed of the signal light and the local light. The amplitude of the beat signal is proportional to amplitude of the signal light and the local light, and the phase of the beat signal is equal to the difference in the optical phase between the signal light and the local light if a carrier wave frequency of the light signal and an optical frequency of the local light are identical. If the optical phase of the local light is identical with the optical phase of the laser light inputted into an optical modulator in a transmitting end, the phase of the beat signal is the optical phase applied to the laser light by the transmitting end. Therefore, the transmitted data are demodulated by transforming the phase of the beat signal into a bit sequence using symbol mapping. That is, if an optical signal with the constellation in FIG. 1 is transmitted from the optical transmitter, an optical receiver is able to receive a signal with the similar constellation.

However, in general, the value of the carrier wave frequency of the signal light does not completely coincide with that of the optical frequency of the local light. Moreover, the optical phase of the local light in the receiver does not coincide with that of the laser light inputted into the optical modulator in the optical transmitter.

The optical phase difference between the signal light and the local light which are inputted into the optical modulator in the optical transmitter is called an optical phase excursion. And, the difference between the carrier wave frequency of the signal light and the optical frequency of the local light is called an optical carrier wave frequency deviation. When an optical phase excursion exists, a signal with constellations rotated an optical phase excursion to the constellation shown in FIG. 1 is received as shown in FIG. 2 (*a*). Because a value of an optical phase excursion cannot be known in advance, a problem that wrong data is demodulated may arise if demodulating a symbol into a bit sequence by using symbol mapping shown in FIG. 1 as is.

If there is an optical carrier wave frequency deviation, the phase of the above-described beat signal becomes equal to the value obtained by adding the optical phase excursion to the product of the optical carrier wave frequency deviation and the receipt time. Therefore, as shown in FIG. 2 (*b*), a signal having constellations with the constellation shown in FIG. 1 rotating temporally is received. Because the phase of the beat signal changes temporally at that time, it is impossible to demodulate data from the phase of the beat signal using symbol mapping shown in FIG. 1.

Accordingly, in an optical phase modulation system, a function for compensating a phase excursion and a carrier wave frequency deviation is required which prevents a constellation from rotating by an optical phase excursion and an optical carrier wave frequency deviation. Hereinafter, a process for compensating a phase excursion and an optical carrier wave frequency deviation will be described, which is widely used in optical phase modulation systems.

Each diagram in FIG. 3 shows a configuration of an optical phase excursion and optical carrier wave frequency deviation compensation circuit (hereinafter, referred to as "a compensation circuit"). FIG. 3 (*a*) is called a feedforward-type and FIG. 3 (*b*) is called a feedback-type. Hereinafter, only the feedforward-type shown in FIG. 3 (*a*) will be described.

An input signal of a compensation circuit is branched into two signals. One of the branched input signals are inputted into a circuit which estimates a phase compensation amount. And the other of the branched input signals are multiplied by a complex number to apply a reverse rotation of the estimated amount of phase compensation, and outputted as a compensated signal.

The circuit which estimates the phase compensation amount includes a phase error detection unit 101, a filter unit 102 and a phase compensation amount calculation unit 103. The phase error detection unit 101 is a circuit which detects a change per unit time of an optical phase excursion, that is, a change in an optical phase excursion between two adjacent symbols. An M-th Power Algorithm (m-th power circuit) shown in FIG. 9 is widely used as such circuit.

The change in optical phase excursions between two adjacent symbols is equal to a product of an optical carrier wave angular frequency deviation and one symbol time (one symbol time is equal to a reciprocal of a symbol rate), and one symbol time is constant. Therefore, the phase error detection unit 101 is a circuit which calculates an optical carrier wave frequency deviation.

The output of the phase error detection unit 101 is sent to the filter unit 102, and a noise component is removed in the filter unit 102. The output of the filter unit 102 is sent to the phase compensation amount calculation unit 103, and the actual phase compensation amount, that is, the rotation of the constellation is calculated. Specifically, the phase compensation amount calculation unit 103 is equivalent to a circuit for holding by integrating.

Finally, a product of the input signal and a complex number (which is expressed as exp (−iϕ), if the phase compensation amount is assumed to be ϕ) which applies a reverse-rotation of the phase compensation amount calculated by the phase compensation amount calculation unit 103 is outputted as an output signal.

FIG. 4 is a diagram showing an example of temporal change in a phase compensation amount estimated by the compensation circuit. A horizontal axis shows time and a vertical axis shows a phase compensation amount. The time will be a reciprocal of a symbol rate inputted to the compensation circuit. As shown in FIG. 4, the phase compensation amount temporally and continuously changes can be seen in this case.

As described above, in the optical communication system using the optical phase modulation system, the transmitted data is demodulated by preventing the constellation from rotating by using the optical phase excursion and optical carrier wave frequency deviation compensation circuit shown in FIG. 3. Because the circuit shown in FIG. 3 is generally executed by digital signal processing, the optical phase modulation system is also called an optical digital coherent system.

However, there is the following problem in realizing an ultra high-speed optical communication system using the above-mentioned system. When a noise component of light, for example, nonlinear noise like impulse noise, phase noise accompanied by a rapid phase change, and ASE noise are added to an input signal, as shown in α-1 of FIG. 5, an estimate value of the phase compensation amount may change discretely suddenly. ASE is an abbreviation of Amplified Spontaneous Emission. Therefore, even if the optical phase excursion and optical carrier wave frequency deviation compensation circuit shown in FIG. 3 is used, a rotation of a constellation by the rapid phase shifting ("a cycle slip". Referred to as "a slip" hereinafter) cannot be prevented, and the symbol mapping changes (rotates). When this event once occurred, a wrong data will be demodulated because the slip occurrence cannot be confirmed in the above-mentioned system.

In order to solve the above-mentioned problem, a method called differential coding is generally used. The differential coding is a coding method with which a bit sequence is correlated to a transition between neighboring two symbols.

FIG. 6 shows an example of a constellation of QPSK to which the differential coding was applied. In the optical communication system using differential coding, as shown in FIG. 6, a bit sequence does not correspond to a symbol itself, but a bit sequence is mapped on a transition from a certain symbol to the same or another symbol. For example, in FIG. 6, a bit sequence 00 is allocated to the transition 1 in which a phase change between the neighboring symbols is +0 degree, a bit sequence 01 to the transition 2 with a phase change of +90 degrees, a bit sequence 11 to the transition 3 of +180 degrees, and a bit sequence 10 to the transition 4 of +270 degrees, respectively.

FIG. 7 is a block diagram showing a configuration of a compensation circuit in an optical communication system using differential coding. FIG. 7 is identical with the compensation circuit shown in FIG. 2 (a) except that a differential decoding unit 104 is added to the subsequent stage of the compensation circuit of FIG. 2(a). The differential decoding unit 104 transforms a transition between neighboring symbols into a predetermined bit sequence, as mentioned above. At that time, because a bit sequence correspond to a transition between neighboring symbols, transmitted data can be decoded correctly even if the constellation rotates.

As described above, if a slip occurred, transmitted data can be decoded correctly by applying differential coding.

As a related art, a technology for supplying a phase synchronization circuit with wide frequency range which can perform drawing-in operation, and a slip detecting device suitable for the phase synchronization circuit is disclosed in patent literature 1. This reduces access time until a signal of a specified recording position of a recording medium is read from an unlocked status.

THE PRECEDING TECHNICAL LITERATURE

Patent Document

[Patent document 1] Japanese Patent Application Laid-Open No. 1997-23157
[Patent document 2] Japanese Patent Application Laid-Open No. 2008-226363
[Patent document 3] Japanese Patent Application Laid-Open No. 1998-229423

SUMMARY OF INVENTION

Technical Problem

However, the monitoring object is a phase difference (phase error) between the signal and clock in the slip detecting in patent literature 1. Accordingly, the related technologies in patent literature 1 does not solve the problem when the constellation is rotated.

Further, in the related technologies described above, there is a problem to be described below.

A bit sequence is allocated to a transition between neighboring symbols in the differential coding system. Therefore, if an error occurs at one symbol, errors occur at both a transition from the preceding symbol and a transition to the subsequent symbol. As a result, in the case of using the differential coding, as compared with the case of not using the differential coding, there is a problem that the bit error ratio (BER) increases. The optical SNR (Signal-to-Noise Ratio), which is necessary for achieving the same transmission characteristics in the same optical communication system, theoretically becomes higher by 3 dB in the case of using the differential coding. As a result, there occurs a problem that nonlinear optical effect due to increasing in optical intensity of optical signals causes deterioration in the transmission characteristics and reduction of the possible transmission distance.

Object of Invention

An object of the present invention has been made in view of the problems which the above-mentioned related technologies have. That is, the object of the present invention is to perform phase compensation (compensation of optical phase excursion and optical carrier wave frequency deviation) by which a slip is corrected and transmitted data is demodulated correctly without deteriorating transmission characteristics, when compensation of an optical phase excursion and optical carrier wave frequency deviation processing is implemented.

Solution to Problem

A phase excursion compensation circuit of a phase modulation signal demodulator of the present invention characterized in that the phase excursion compensation circuit detects occurrence of a slip of a received signal from a change in a phase compensation amount performed to the received signal by a phase excursion compensation means, and corrects the phase compensation amount of the received signal after occurrence of the slip.

A phase excursion compensation method of the present invention comprising: detecting occurrence of a slip of a received signal from a change in a phase compensation amount of the received signal; and correcting the phase compensation amount of the received signal after the occurrence of the slip.

Advantageous Effects of Invention

According to the present invention, phase compensation (optical phase excursion and optical carrier wave frequency deviation compensation) which can correct a slip and can demodulate transmitted data correctly can be performed without deteriorating the transmission characteristics when optical phase excursion and optical carrier wave frequency deviation compensation processing is implemented.

BRIEF DESCRIPTION OF THE DRAWINGS

FIG. 1 is an example of a constellation of QPSK and symbol mapping.

FIG. 2 (*b*) is a diagram showing an example of a constellation of QPSK which rotated continuously by an optical carrier wave frequency deviation, and symbol mapping.

FIG. 3 (*a*) is a block diagram showing a configuration of an optical phase excursion and optical carrier wave frequency deviation compensation circuit of a feedforward-type. FIG. 3 (*b*) is a block diagram showing a configuration of an optical phase excursion and optical carrier wave frequency deviation compensation circuit of a feedback-type.

FIG. 4 is a diagram showing a temporal change of an estimation value of a phase compensation amount.

FIG. 5 is a diagram showing a temporal change of an estimation value of a phase compensation amount by noise.

FIG. 6 is a diagram showing an example of a constellation of QPSK to which differential coding was applied and symbol mapping.

FIG. 29 is an example of a timing chart showing the timing of a signal in a slip correction unit 207 in the fifth exemplary embodiment.

DESCRIPTION OF EXEMPLARY EMBODIMENT

Hereinafter, exemplary embodiments of the present invention will be described in detail with reference to drawings.

First Exemplary Embodiment

Hereinafter, a first exemplary embodiment of the present invention will be described with reference to drawings.

(Configuration)

Figure 2B:
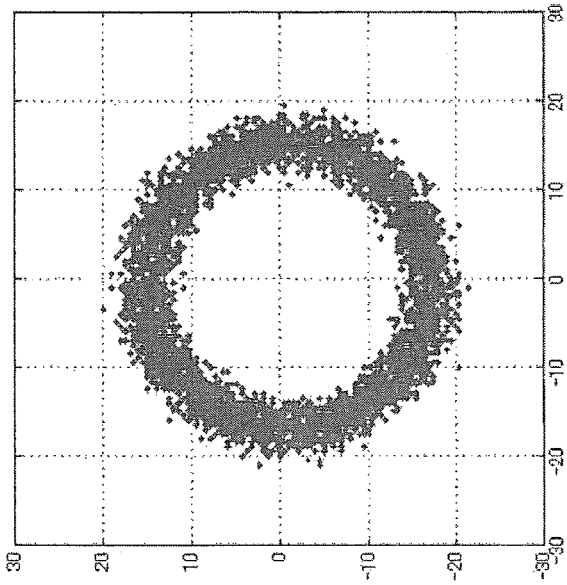
FIG. 2 (*a*) is a diagram showing an example of a constellation of QPSK which rotated by an optical phase excursion and symbol mapping.
Figure 2A:
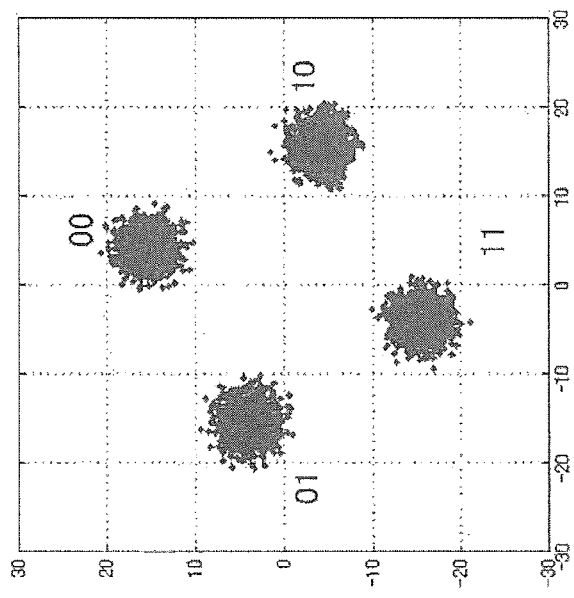
Figure 7:
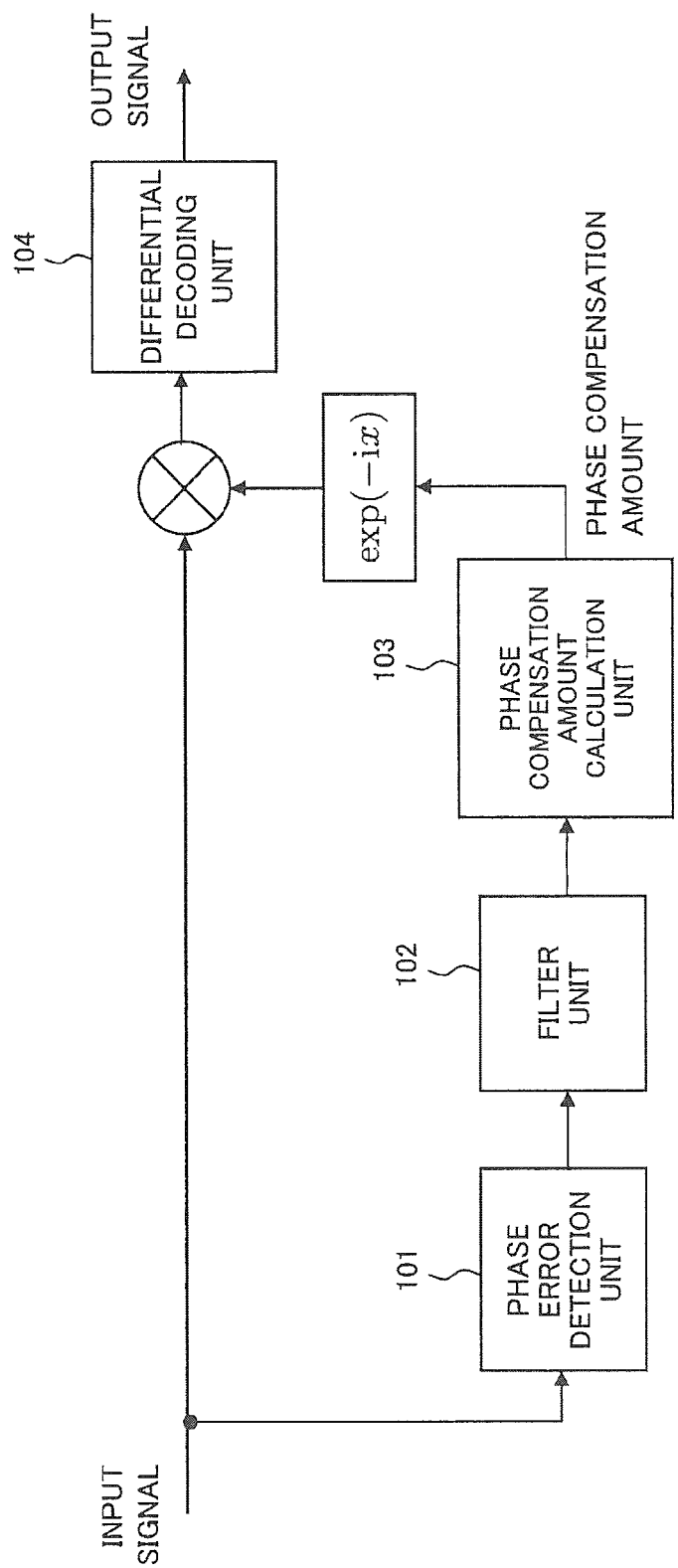
FIG. 7 is a diagram showing a configuration of a compensation circuit using differential coding.
Figure 8:
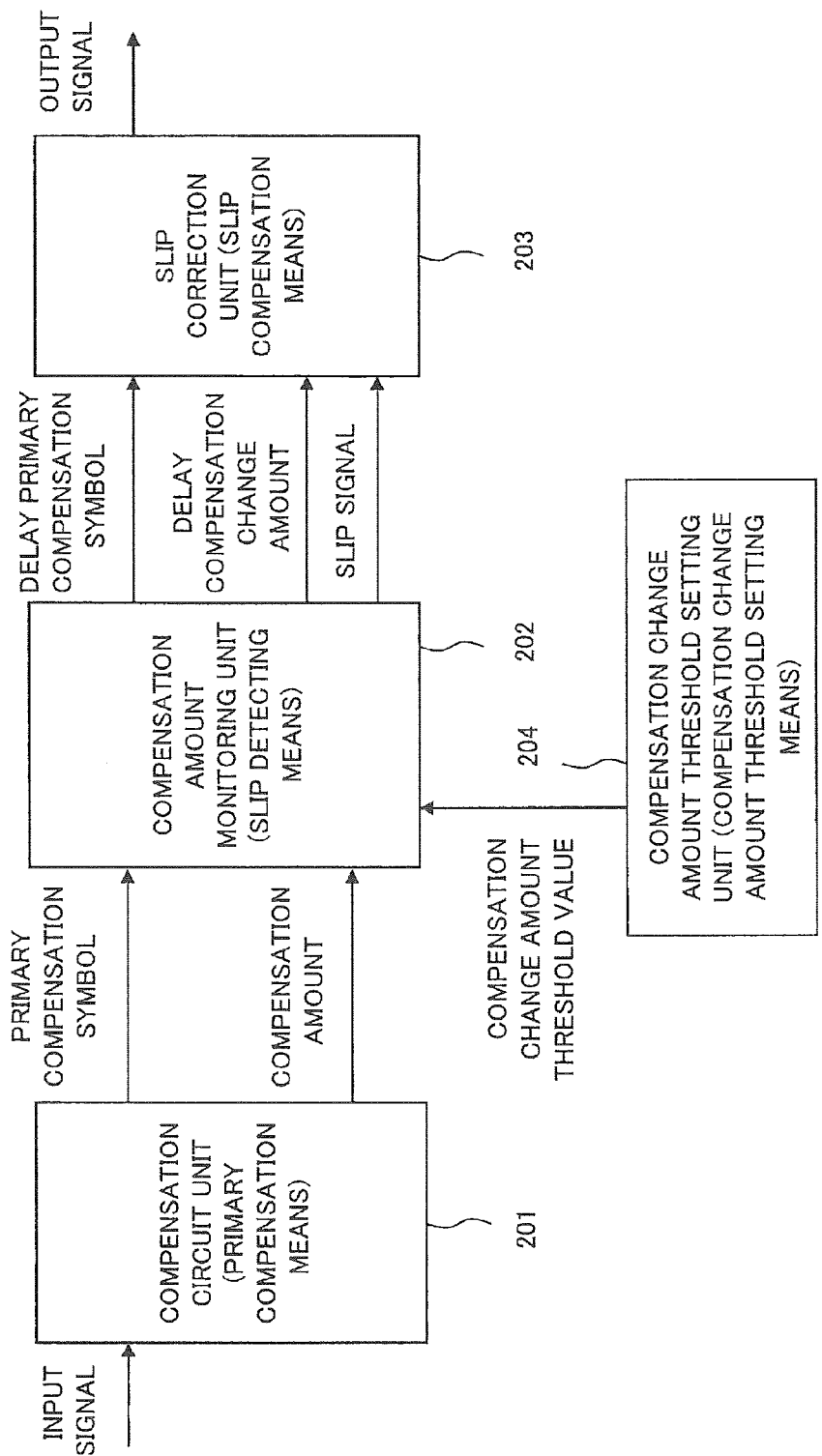
FIG. 8 is a diagram showing a configuration of a slip compensation circuit in a first exemplary embodiment.
Figure 9:
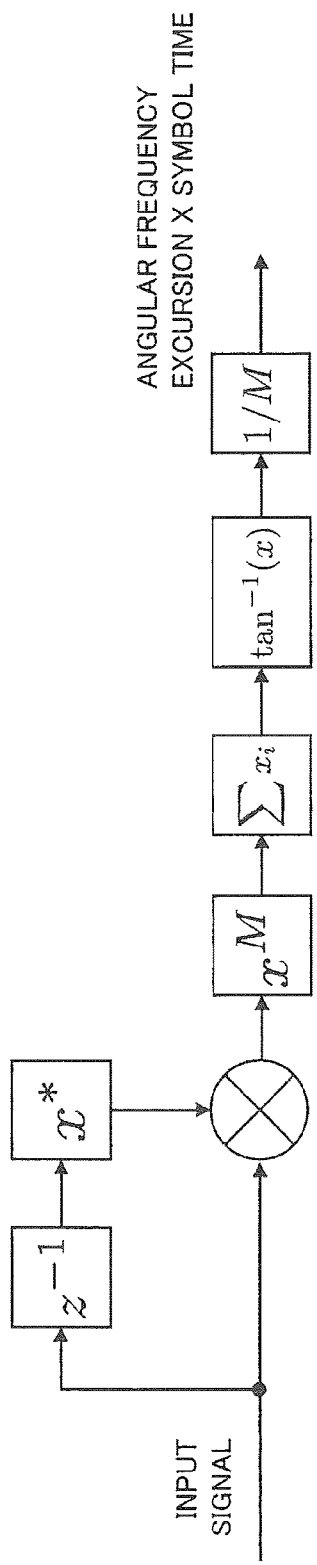
FIG. 9 is a block diagram showing a configuration of a phase error detection unit by an M-th power algorithm (m-th power circuit).

Referring to FIG. 8, a block diagram showing a configuration of compensation circuit of an optical phase excursion and optical carrier wave frequency deviation (hereinafter, referred to as a slip compensation circuit) as a first exemplary embodiment of the present invention is shown.

As shown in FIG. 8, the slip compensation circuit in the first exemplary embodiment includes a compensation circuit unit 201, a compensation amount monitoring unit 202, a slip correction unit 203 and a compensation change amount threshold setting unit 204.

The compensation circuit unit 201 outputs a signal which compensated the phase of the input signal and the compensation amount of the phase of the estimated input signal to the compensation amount monitoring unit 202 as a first compensation symbol signal and the compensation amount respectively.

Figure 10:
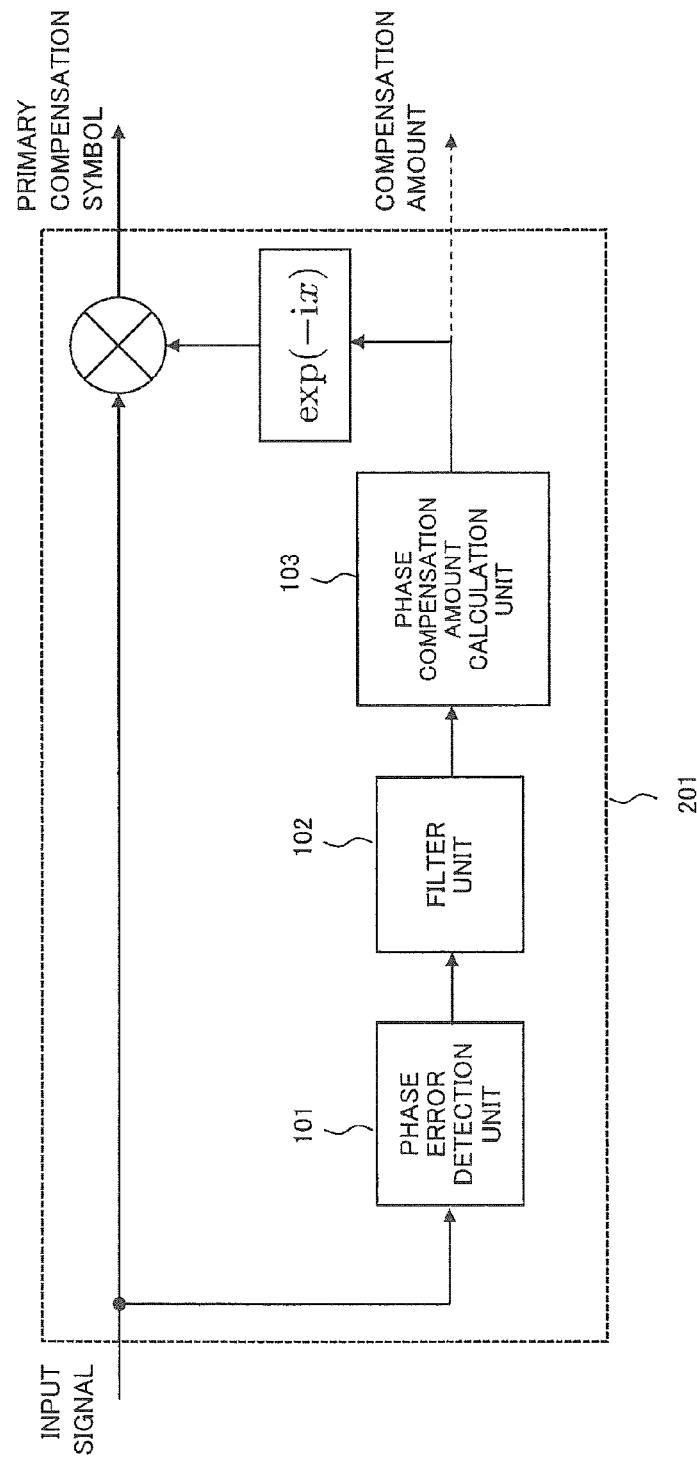
FIG. 10 is a block diagram showing a configuration of a compensation circuit unit (optical phase excursion and optical carrier wave frequency deviation compensation circuit) 201 in the first exemplary embodiment.

A configuration of the compensation circuit unit 201 shown in FIG. 8 is shown in FIG. 10. Although this circuit has a configuration similar to the compensation circuit shown in FIG. 3 (*a*) or FIG. 3 (*b*) basically, as shown in FIG. 10, a phase compensation amount which the compensation circuit estimates can be notified to other function blocks is different.

The compensation amount monitoring unit 202 shown in FIG. 8 monitors a change in the compensation amount inputted from the compensation circuit unit 201. If a change beyond the compensation change threshold value inputted from the compensation change amount threshold setting unit 204 occurred in the compensation amount, the compensation amount monitoring unit 202 outputs a slip signal which showed the occurrence point and a delay compensation change amount which delayed the compensation change amount to the slip correction unit 203. Here, the compensation change amount threshold value is a threshold value of a compensation change amount of the phase.

Figure 11:
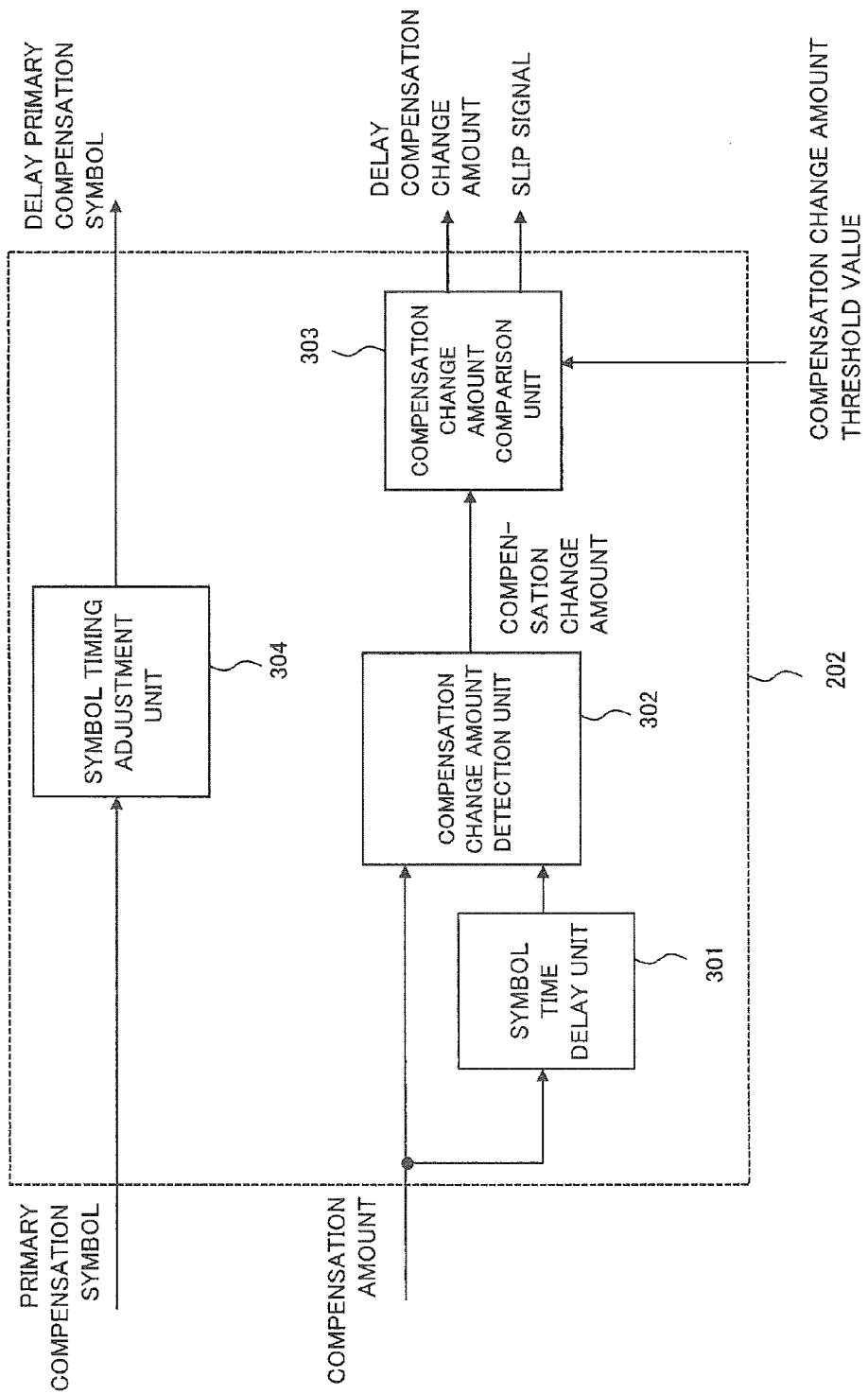
FIG. 11 is a block diagram showing a configuration of a compensation amount monitoring unit 202 in the first exemplary embodiment.

Referring to FIG. 11, the details of the compensation amount monitoring unit 202 shown in FIG. 8 is shown. The compensation amount monitoring unit 202 includes a symbol time delay unit 301, a compensation change amount detection unit 302, a compensation change amount comparison unit 303 and a symbol timing adjustment unit 304.

The symbol time delay unit 301 delays a compensation amount outputted from the compensation circuit unit 201 of FIG. 8 by J symbol time (here, J is a positive integer and set to J=1 as an example in the present exemplary embodiment), and outputs the compensation amount to the compensation change amount detection unit 302.

The compensation change amount detection unit 302 inputs the compensation amount outputted from the compensation circuit unit 201 of FIG. 8 and the compensation amount before J symbol time outputted from the symbol time delay unit 301 of FIG. 11. After that, the compensation change amount detection unit 302 obtains the difference of the compensation amount before J symbol time and the compensation amount outputted from the compensation circuit unit 201 of FIG. 8, and outputs the compensation amount as a compensation change amount to the compensation change amount comparison unit 303.

The compensation change amount comparison unit 303 compares the compensation change amount outputted to the compensation change amount detection unit 302 and the compensation change threshold value outputted from the compensation change amount threshold setting unit 204 and outputs the result to the slip correction unit 203 as a slip signal and a delayed compensation change amount.

The symbol timing adjustment unit 304, in order to synchronize a timing of a primary compensation symbol outputted from the compensation circuit unit 201 of FIG. 8 to the slip signal outputted from the compensation change amount comparison unit 303, and the delay compensation change amount, performs a delay adjustment for the primary compensation symbol. After that, the symbol timing adjustment unit 304 outputs the delay adjusted primary compensation symbol to the slip correction unit 203.

Figure 12:
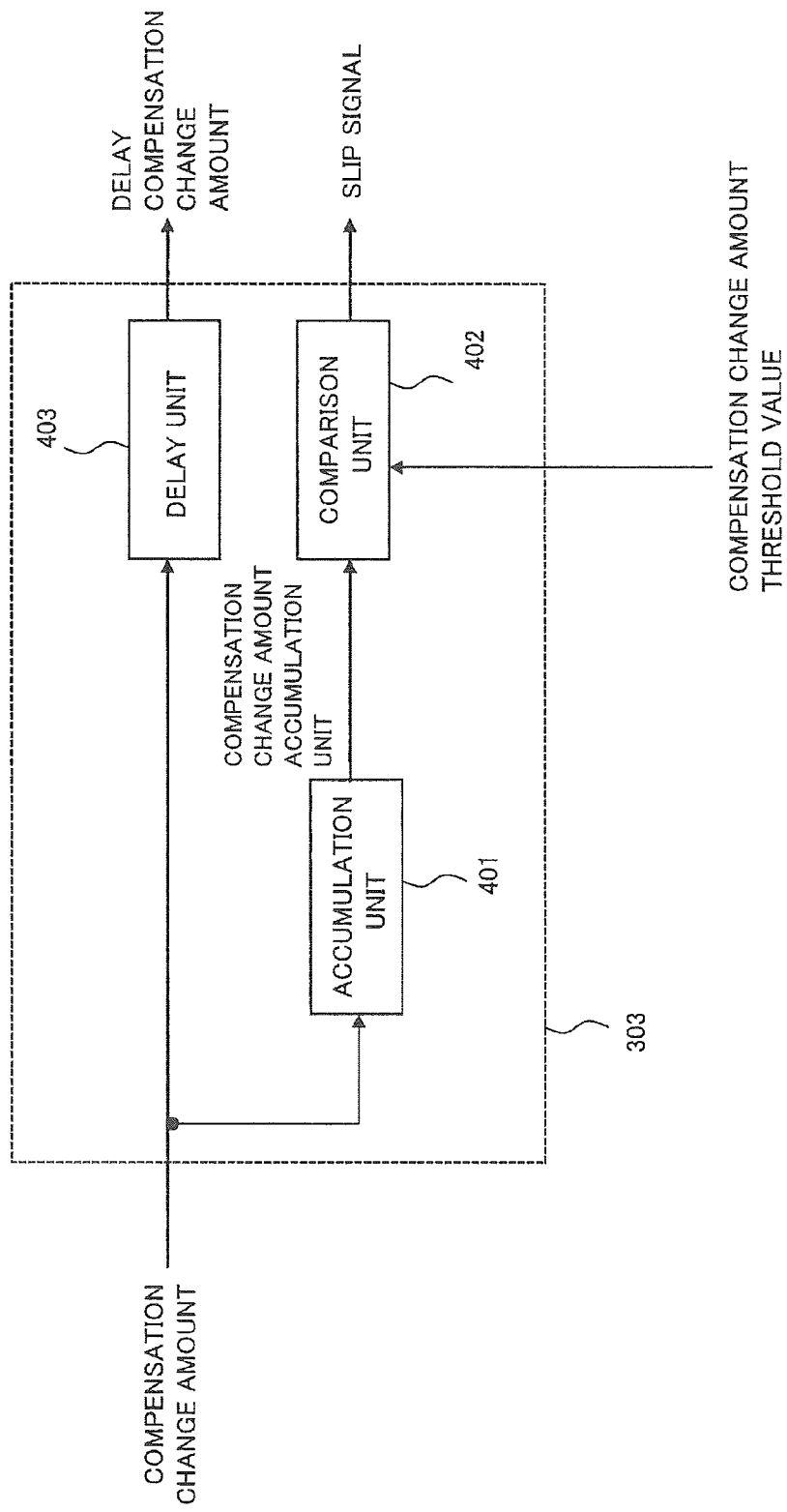
FIG. 12 is a block diagram showing a configuration of a compensation change amount comparison unit 303 in the first exemplary embodiment.

Referring to FIG. 12, the details of the compensation change amount comparison unit 303 shown in FIG. 11 is shown.

An accumulation unit 401 adds one corresponding to K symbol time (here, K is a positive integer and set to K=2 in the present exemplary embodiment) to the compensation change amount outputted from the compensation change amount detection unit 302, and outputs the compensation change amount to a comparison unit 402 as an accumulated value of the compensation change amount. The reason that the accumulation unit 401 is provided is as follows. A compensation change amount due to a slip within one symbol time actually may not be large sufficiently necessarily. Accordingly, the compensation change amount are summed (integrated) for two or more symbols to detect slip occurrence more certainly.

The comparison unit 402 compares a compensation change amount accumulation value inputted from an accumulation unit 401 and a compensation change amount threshold value inputted from the compensation amount change threshold setting unit 204 and outputs the result to the slip correction unit 203 as a slip signal. When a slip occurred, as for the slip signal, the value is set to "1", and "0" is set in other cases.

A delay unit 403 delays the compensation change amount inputted from the compensation change amount detection unit 302 by an L symbol time (L is a positive integer), and outputs the compensation change amount to the slip correction unit 203 as the delayed compensation change amount. In this exemplary embodiment, the compensation change amount is delayed (by L=K symbol time delay) in accordance with the accumulated time (above-mentioned K symbol time) of the accumulation unit.

The slip correction unit 203 shown in FIG. 8 corrects the phase of the delayed primary compensation symbol outputted from the above-mentioned compensation amount monitoring unit 202 using a slip signal outputted from the compensation amount monitoring unit 202 and the compensation change amount.

Figure 13:
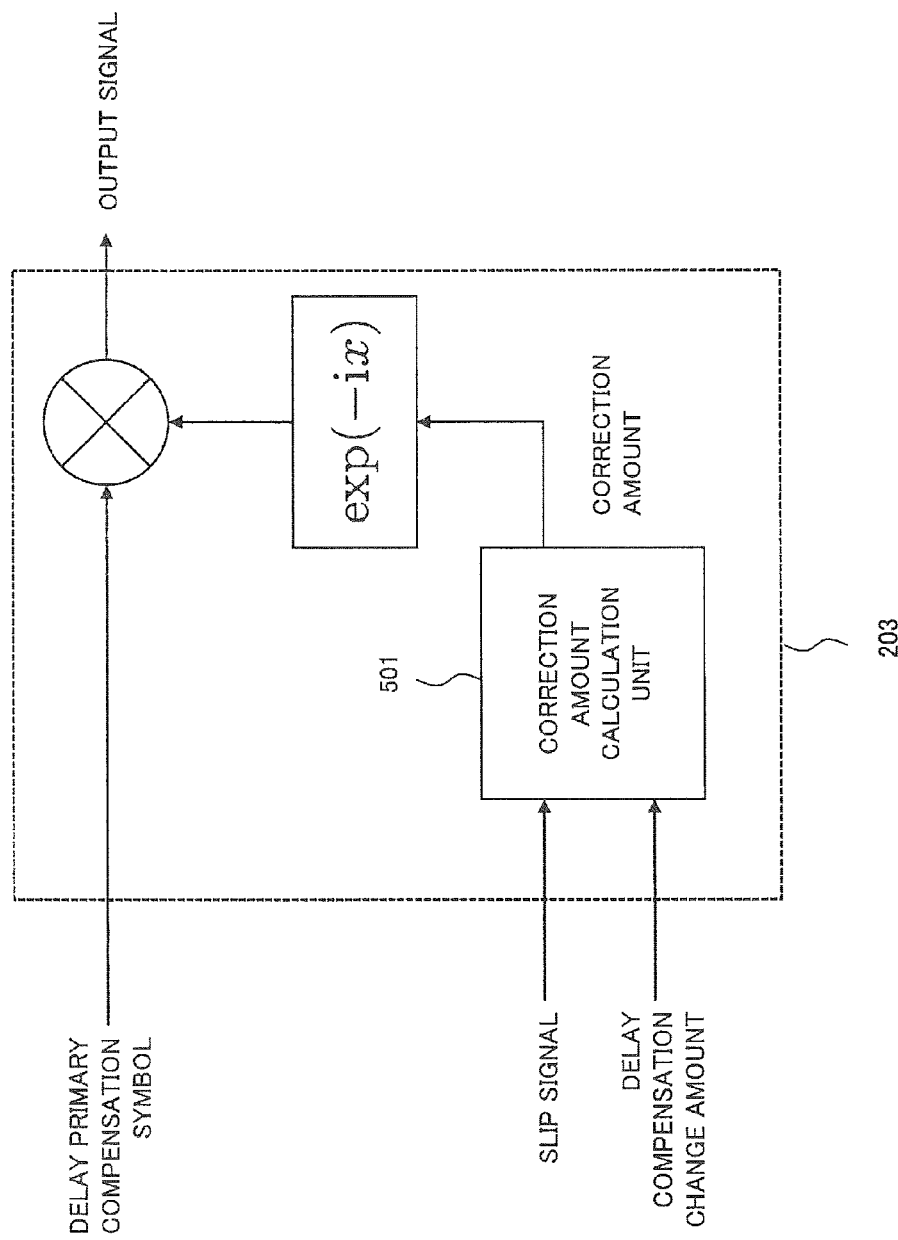
FIG. 13 is a block diagram showing a configuration of a slip correction unit 203 in the first exemplary embodiment.

Referring to FIG. 13, the details of the slip correction unit 203 shown in FIG. 8 is shown.

A correction amount calculation unit 501 calculates a correction amount from a delay compensation change amount and a slip signal which are outputted from the compensation amount monitoring unit 202 and outputs. The correction amount calculated by the correction amount calculation unit 501 is multiplied by a complex number (it is expressed as exφ(−iφ), if a phase compensation amount is φ) and an input signal, and is outputted as an output signal.

(Operation)

Next, operation of the slip compensation circuit in the first exemplary embodiment will be described using block diagrams shown in FIGS. 8, 10, 11, 12 and 13 and timing charts shown in FIGS. 14, 15, 16, 17, 18 and 19.

Figure 14:
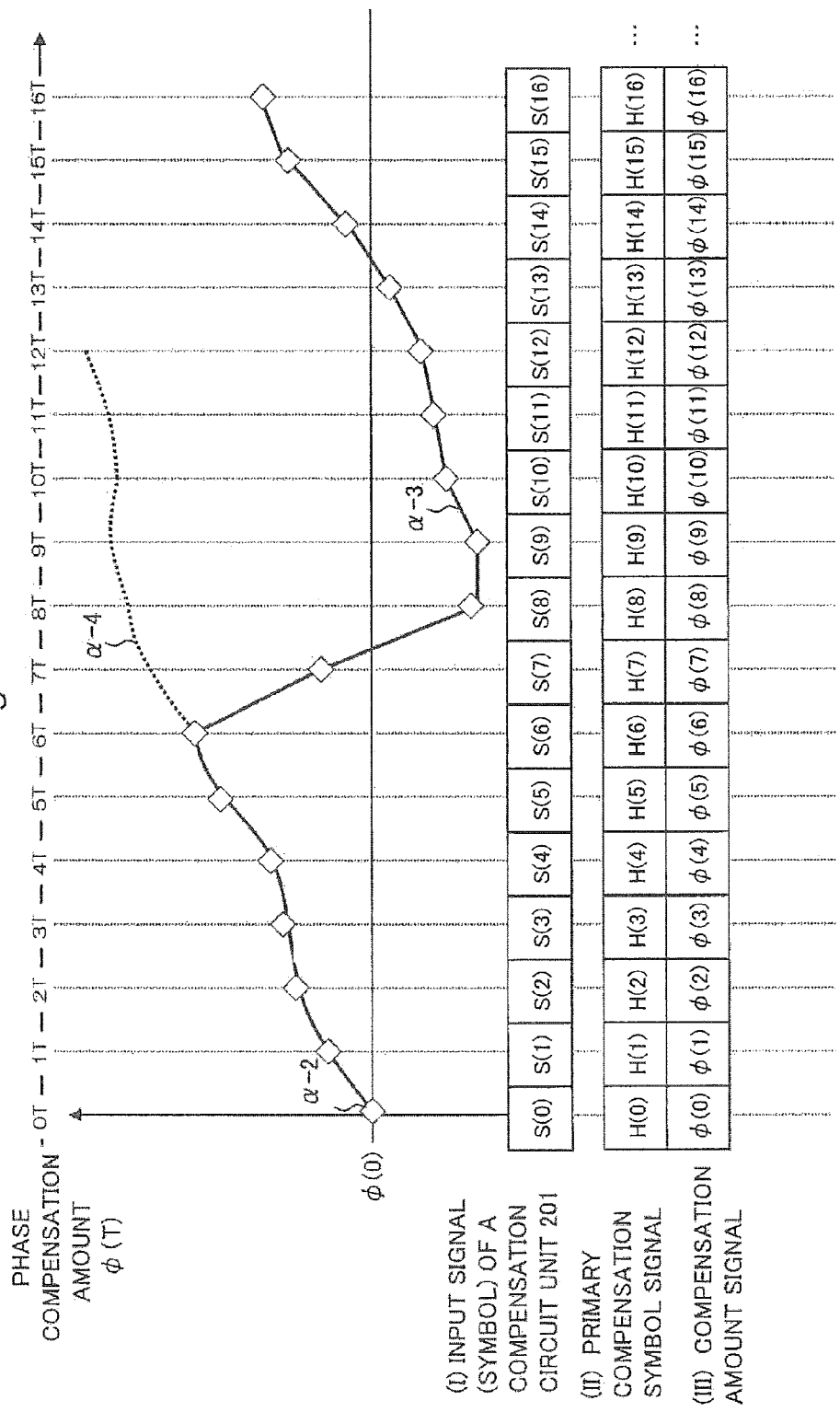
FIG. 14 is an example of a timing chart showing the input-output timing of the compensation circuit unit 201 in the first exemplary embodiment.

FIG. 14 is a timing chart of the compensation circuit unit 201 shown in FIG. 8. The input signals (symbols) S(0)-S(16) of (i) of the compensation circuit unit 201 in FIG. 14 correspond to the symbol m to the symbol m+16 in the part of α-1 where the compensation amount changed due to the influence of the noise shown in FIG. 5. The primary compensation symbol signals H(0)-H(16) of (ii) and the compensation amount signals φ(0)-φ(16) of (iii) in FIG. 14 are output from the compensation circuit unit 201.

α-3 in FIG. 14 shows the compensation amount p of the phase outputted from the compensation circuit unit 201. α-2 in FIG. 14 shows the compensation amount φ(0) at the time 0T. α-4 in FIG. 14 shows the compensation amount φ when a slip does not occur, and the slip compensation circuit in the first exemplary embodiment corrects α-3 compensation amount to α-4.

Further, 0T-16T of FIG. 14 show the time from the symbol m shown in FIG. 5, and 1T corresponds to one symbol time.

When receiving S(0) of (i) Input signal (symbol) of a compensation circuit unit 201 in FIG. 14 at the time 0T, the compensation circuit unit 201 of FIG. 8, as described in the section of the related art, performs estimating the phase compensation amount, and compensating the input signal with the estimated phase compensation amount. At that time, the compensation circuit unit 201 outputs the estimated phase compensation amount φ(1) and the primary compensation symbol signal H(1), which compensated the phase of the input signal to the compensation amount monitoring unit 202 at the time 1T.

Next, operation of the compensation amount monitoring unit 202 of FIG. 8 will be described using a block diagram shown in FIG. 11 and a timing chart shown in FIG. 15.

Figure 15:
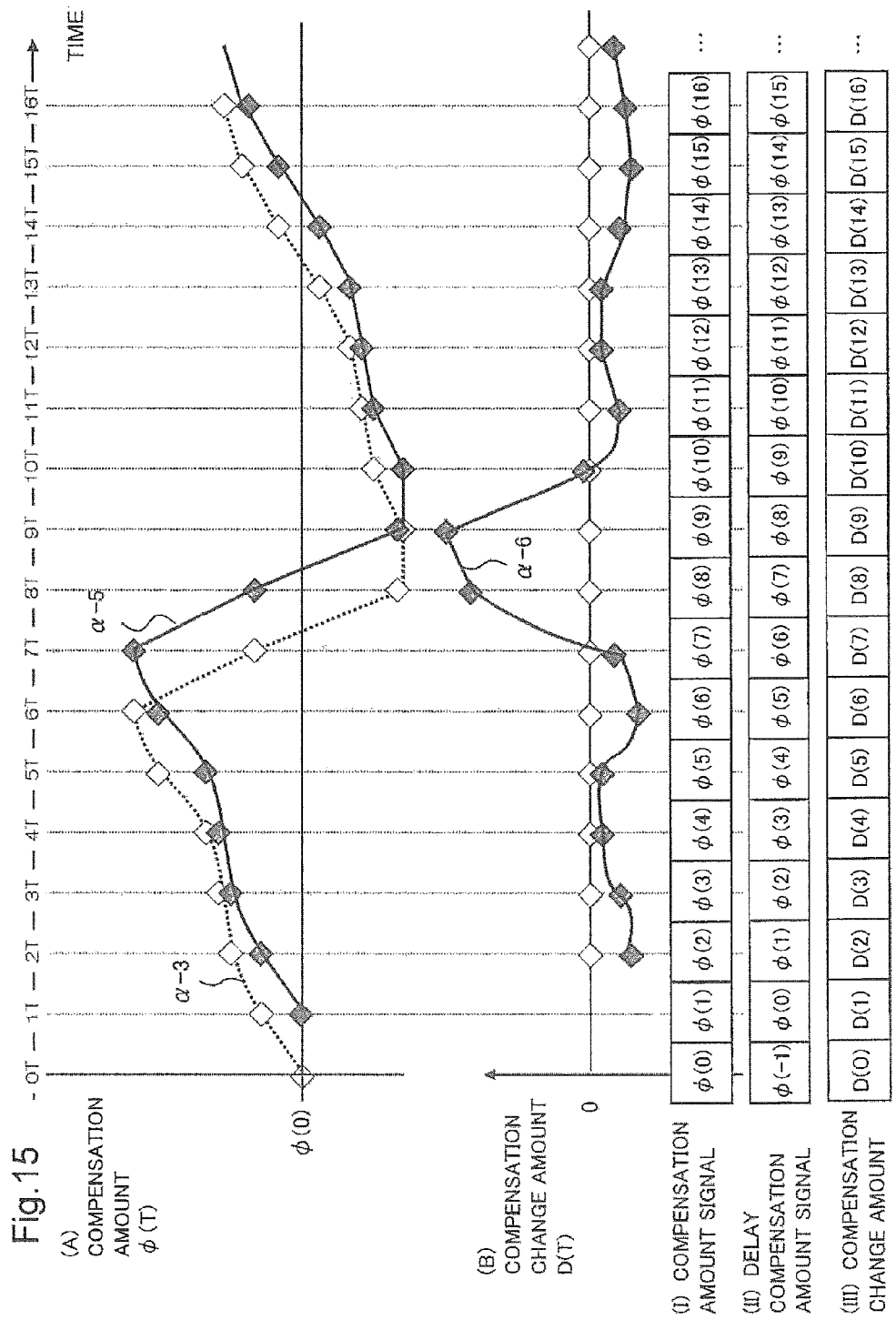
FIG. 15 shows examples of timing charts showing the input-output timing of a symbol time delay unit 301 and a compensation change amount detection unit 302 in the first exemplary embodiment.

FIG. 15 shows timing charts for the symbol time delay unit 301 and the compensation change amount detection unit 302 shown in FIG. 11. The compensation amount signals φ(0)-φ(16) of (i) in FIG. 15 are output signals from the compensation circuit unit 201. The delay compensation amount signals φ(−1)-φ(15) of (ii) in FIG. 15 are output signals from the symbol time delay unit 301 in FIG. 11. The compensation change amount signals D(0)-D(16) of (iii) in FIG. 15 are output signals from the compensation change amount detection unit 302. Further, the graph α-3 shows the compensation amount signal φ of (i), the graph α-5 shows the delay compensation amount signal φ of (ii), and the graph α-6 shows the compensation change amount signal of (iii) in FIG. 15.

In FIG. 15, when the compensation amount signal φ(1) of (i) is given to the symbol time delay unit 301 shown in FIG. 11 at the time 1T, the symbol time delay unit 301 delays the compensation amount signal φ(1) by J symbol time (J is a positive integer of no smaller than 1, and J is set to 1 in this exemplary embodiment). After that, the symbol time delay unit 301 outputs the compensation amount signal to the compensation change amount detection unit 302 shown in FIG. 11 as the delay compensation amount signal φ (1) of (ii) at the time 2T.

At the time 2T, the compensation amount φ(2) of (i) and the delay compensation amount signal φ(1) of (ii) in FIG. 15 are given to the compensation change amount detection unit 302 shown in FIG. 11. Then, at the time 3T, the compensation change amount detection unit 302 obtains the difference of φ(1) and φ(2), and outputs the compensation change amount D(3) of (iii) to the compensation change amount comparison unit 303 shown in FIG. 11.

Next, operation of the compensation change amount comparison unit 303 of FIG. 11 will be described using a block diagram shown in FIG. 12 and a timing chart shown in FIG. 16.

Figure 16:
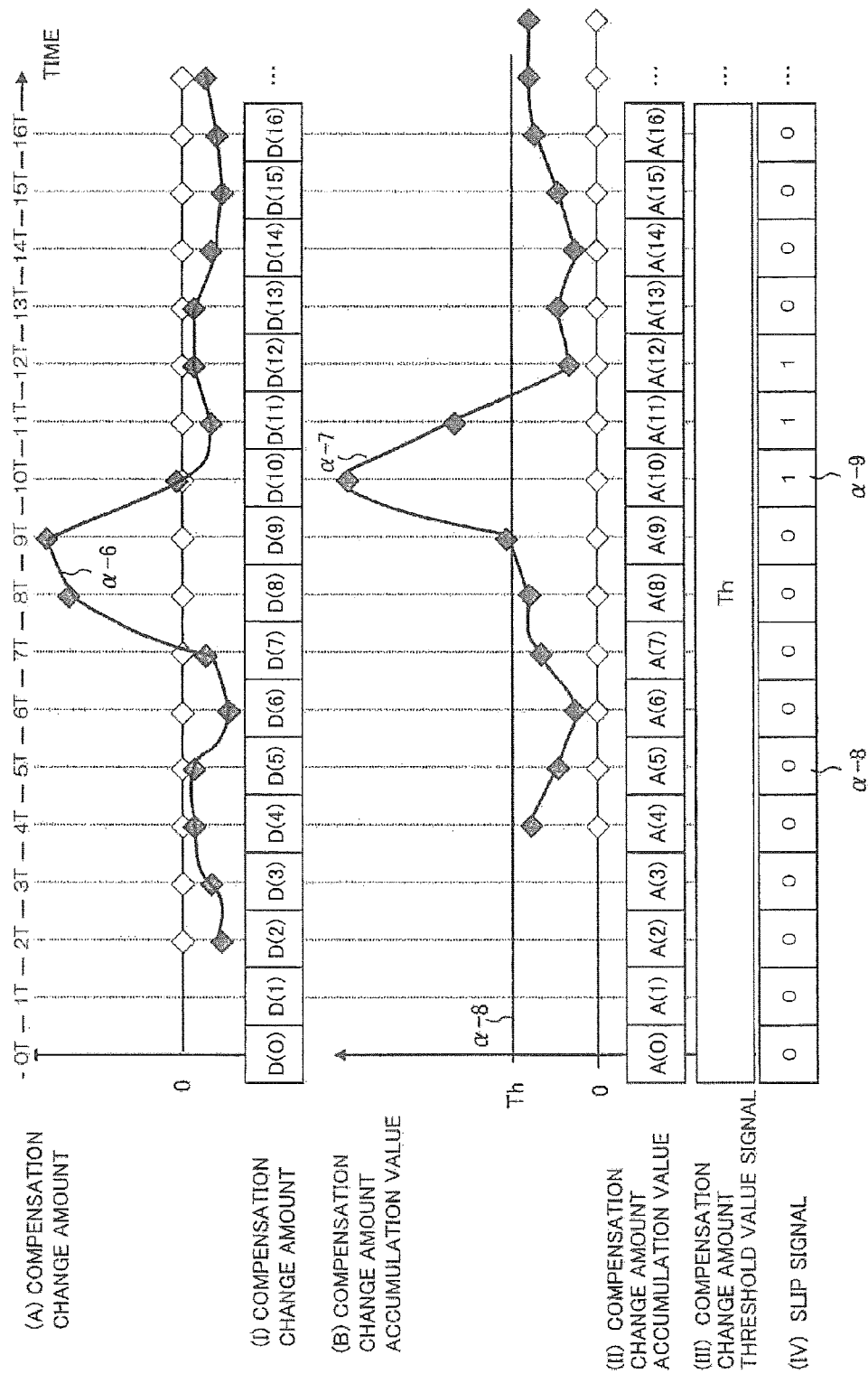
FIG. 16 shows examples of timing charts showing the input-output timing of an accumulation unit 401 and a comparison unit 402 in the first exemplary embodiment.

The compensation change amount signals D(0)-D(16) of (i) in FIG. 16 are output signals from the compensation change amount detection unit 302. The compensation change amount accumulated values A(0)-A(16) of (ii) in FIG. 16 are the output signals from the accumulation unit 401 in FIG. 12. The compensation change threshold value signal Th of (iii) in FIG. 16 is the output from the compensation change amount threshold setting unit 204 in FIG. 8. More the slip signal of (iv) in FIG. 16 is the output from the comparison unit 402 in FIG. 12.

Further, the graph α-6 shows the compensation change amount signal of (i), the graph α-7 shows the compensation change amount accumulation value of (ii), and the graph α-8 shows the compensation change amount threshold value signal, respectively in FIG. 16.

In FIG. 16, when the compensation change amount D(3) of (i) is given to the accumulation unit 401 shown in FIG. 12 at the time 3T, the accumulation unit 401 adds a compensation change amount for the K symbol time thereto and outputs its absolute value to the comparison unit 402 shown in FIG. 12 as the compensation change amount accumulated value A (4) of (ii) at the time 4T. Because K=2 is set in this exemplary embodiment for example, the compensation change amount accumulated value A (4) at the time 4T will be an absolute value of the summation of the compensation change amounts D(2) and D(3), that is, A (4)=|D (2)+D (3)|.

In FIG. 16, when the compensation change amount accumulated value A (4) of (ii) and the compensation change threshold value signal Th of (iii) are inputted to the comparison unit 402 shown in FIG. 12 at the time 4T, the comparison unit 402 compares the compensation change amount accumulated value A (4) and the compensation change threshold value signal Th. After that, when the compensation change amount accumulated value A (4) is less than the compensation change amount threshold value signal Th, the comparison unit 402, at the time 5T, outputs the slip signal α-8 of a numerical value 0 which shows that a slip does not occur to the slip correction unit 203 in FIG. 8.

Further, when the compensation change amount accumulation value A (9) is the compensation change amount threshold value signal Th or more like the time 9T, the slip is considered to have occurred, and the slip signal α-9 of a numerical value "1", which shows the slip occurrence is outputted to the slip correction unit 203 in FIG. 8 at the time 10T.

Next, operation of the symbol timing adjustment unit 304 in FIG. 11 and the delay unit 403 in FIG. 12 will be described using timing charts shown in FIG. 17.

Figure 17:
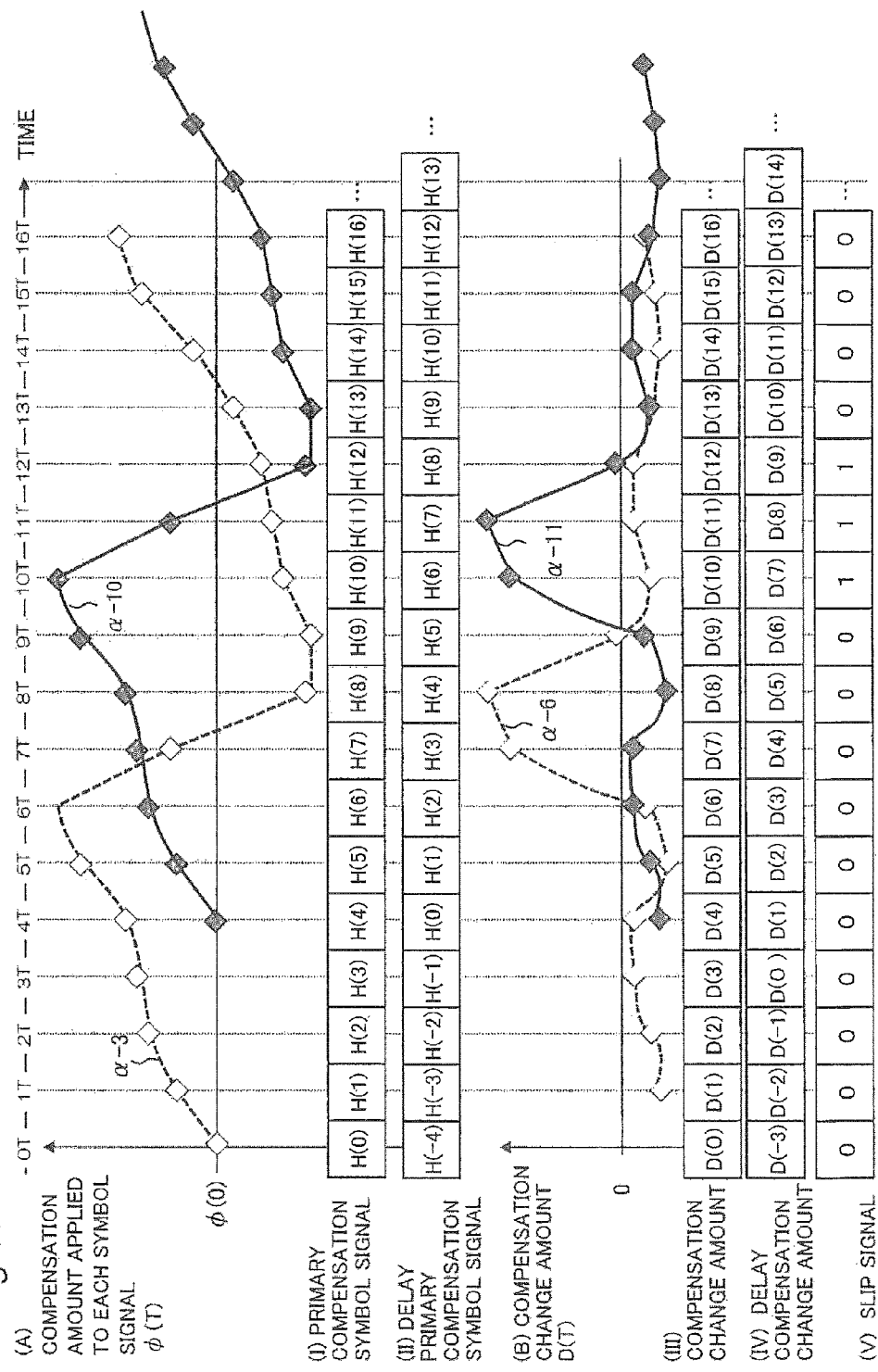
FIG. 17 shows examples of timing charts showing the input-output timing of a symbol timing adjustment unit 304 and a delay unit 403 in the first exemplary embodiment.

The primary compensation symbol signals H(0)-H(16) of (i) and the compensation change amount signals D(0)-D(16) of (iii) in FIG. 17 are output signals from the compensation circuit unit 201 in FIG. 8. The delay primary compensation symbol signals H(−4)-H(13) of (ii) in FIG. 17 are output signals from the symbol timing adjustment unit 304 in FIG. 11. The delay compensation change amounts D(−3)-D (14) of (iv) in FIG. 17 are the output from the delay unit 403 in FIG. 12. More the slip signal of (v) in FIG. 17 is the output from the comparison unit 402 in FIG. 12.

Further, the graph α-3 shows the primary compensation symbol signal of (i), the graph α-10 shows delayed primary compensation symbol signal of (ii), the graph α-6 shows the compensation change amount signal of (iii), and the graph α-11 shows the delay compensation change amount signal of (iv), respectively in FIG. 17.

In FIG. 17, the primary compensation symbol signal H(0) of (i) is given to the symbol timing adjustment unit 304 in FIG. 11 at the time 0T. The symbol timing adjustment unit 304 delays the primary compensation symbol signal H(0) in accordance with the processing delay for the slip signal of (v), and outputs the delay primary compensation symbol signal H(0) to the slip correction unit 203 in FIG. 8 at the time 4T.

In case of this exemplary embodiment, the processing delay in the compensation change amount detection unit 302 in FIG. 11 is set to 1T (T is a time per symbol), the delay in the accumulation unit 401 in FIG. 12 is set to 2T (because an accumulation symbol time of the compensation change amount accumulated is set to K=2), and the delay in the comparison unit 402 in FIG. 12 is set to 1T. Accordingly, the delay primary compensation symbol signal H(0) is delayed 4T (4 symbol time) in total.

In FIG. 17, when the compensation change amount D(1) of (iii) is inputted to the delay unit 403 in FIG. 12 at the time 1T, the delay unit 403 delays the compensation change amount D(1) in accordance with the processing delay for the slip signal of (v). After that, the delay unit 403 outputs the delay compensation change amount D(1) to the slip correction unit 203 in FIG. 8 at the time 4T. In case of this exemplary embodiment, the delay in the accumulation unit 401 in FIG. 12 is set to 2T (because the accumulation symbol time of the compensation change amount accumulated is set to K=2 in this exemplary embodiment), and the delay in the comparison unit 402 is set to 1T. Accordingly, the delay compensation change amount D(1) is delayed 3T (3 symbol time) in total.

Next, operation of the slip correction unit 203 in FIG. 8 will be described using a block diagram shown in FIG. 13 and timing charts shown in FIGS. 18 and 19.

The delay compensation change amounts D(0)-D(16) of (i) and the slip signal of (ii) are output signals from the compensation amount monitoring unit 202 in FIG. 8. In FIG. 18, the correction amounts B (3)-B (19) of (iii) are output signals from the correction amount calculation unit 501 in FIG. 13.

Figure 18:
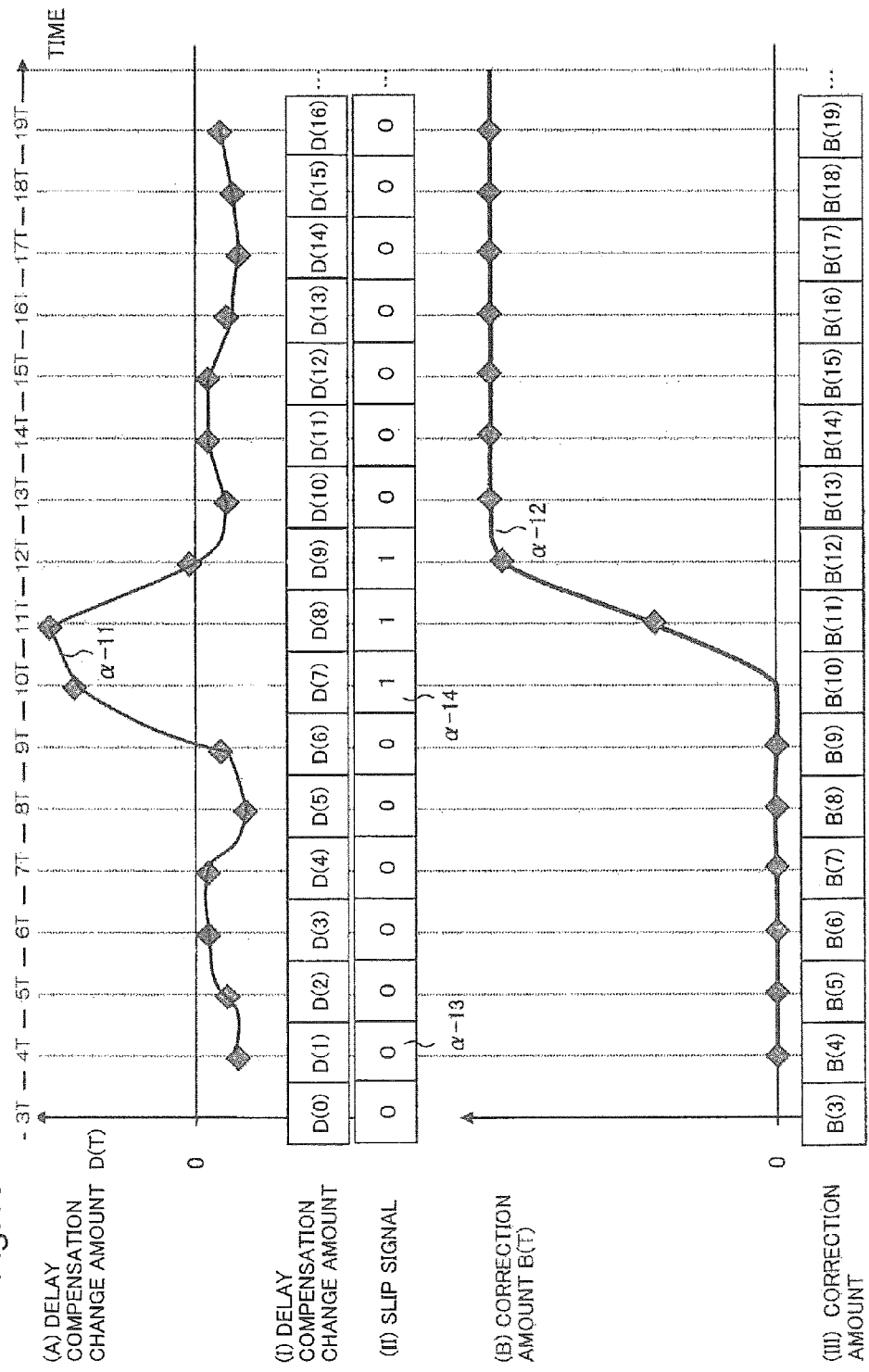
FIG. 18 is an example of a timing chart showing the input-output timing of a correction amount calculation unit 501 in the first exemplary embodiment.

Further, the graph α-11 in FIG. 18 shows the delay compensation change amount of (i) and the graph α-12 shows the correction amount of (iii), respectively.

In FIG. 18, the delay compensation change amount of (i) and the slip signal of (ii) are inputted to the correction amount calculation unit 501 in FIG. 13. Then, when the slip signal is a value "1" which shows occurrence of a phase slip, the correction amount calculation unit 501 sums the delay compensation change amount and the correction amount of 1 symbol time ago and outputs the addition result as a correction amount.

When a value of the slip signal is a value "0" which shows non-occurrence of a phase slip, the correction amount of 1 symbol time ago is outputted without summing of the delay compensation change amount and the correction amount.

In case of this exemplary embodiment, the delay compensation change amount D(1) of (i) in FIG. 18 and the slip signal α-13 of (ii) are inputted to the correction amount calculation unit 501 in FIG. 13 at the time 4T. Because the value of the slip signal α-13 is "0", the correction amount calculation unit 501 outputs the value of the correction amount B (4) as the correction amount B (5) at the time 5T.

The delay compensation change amount D(7) of (i) and the slip signal α-14 of (ii) in FIG. 18 are inputted to the correction amount calculation unit 501 in FIG. 13 at the time 10T. Because the value of the slip signal α-14 is "1", the correction amount calculation unit 501 outputs the sum of the correction amount B (10) and the delay compensation change amount D(7) at the time 11T as the correction amount B (11).

Further, in this exemplary embodiment, although the initial value of the correction amount B is set to "0", it is not limited to this value particularly.

Figure 19:
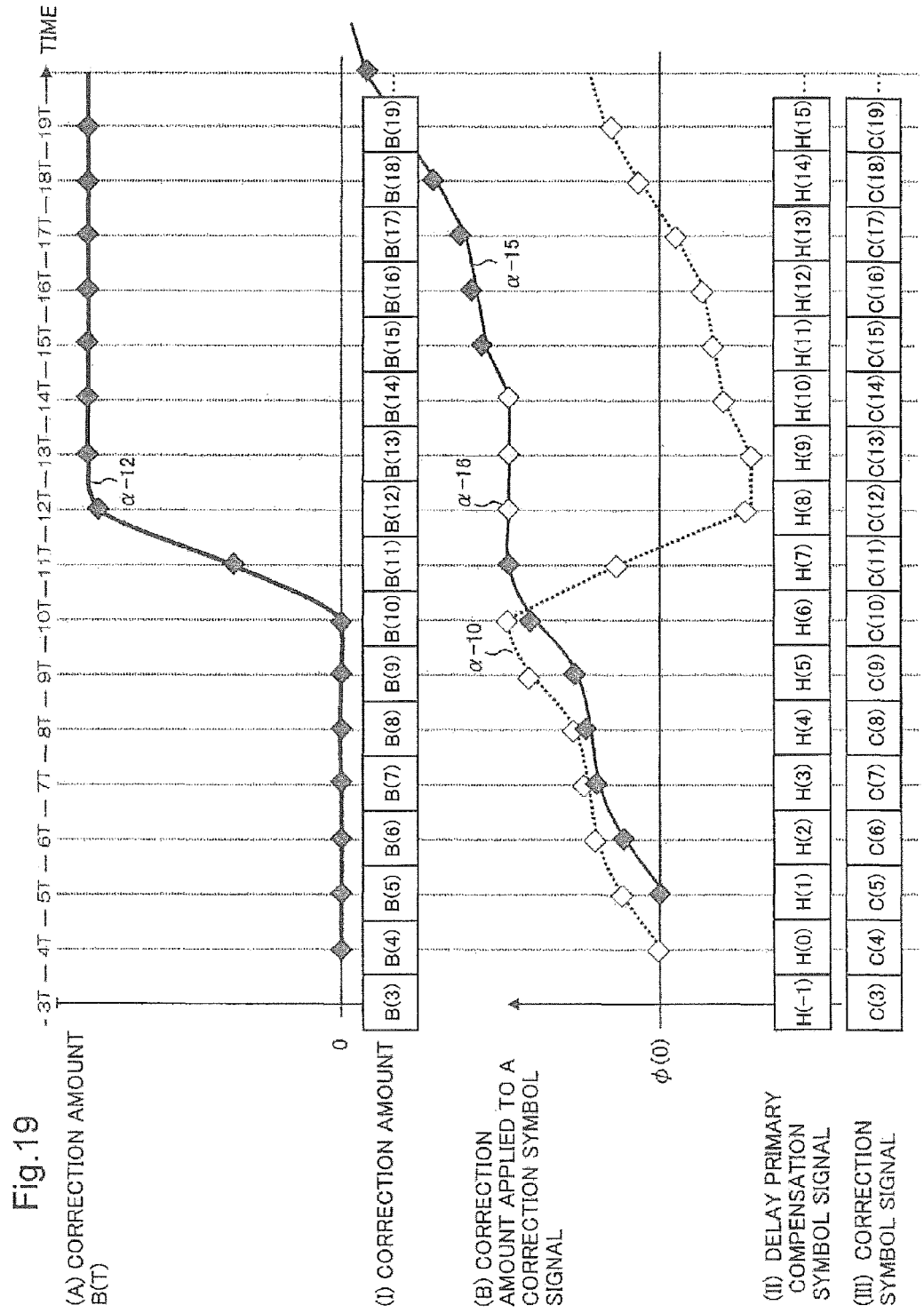
FIG. 19 is an example of a timing chart showing the timing of a signal in the slip correction unit 203 in the first exemplary embodiment.

The correction amounts B (3)-(19) of (i) in FIG. 19 are the output signals from the correction amount calculation unit 501 in FIG. 13. The delay primary compensation symbol signals H (−1)-H (15) of (ii) in FIG. 19 are the output signals from the compensation amount monitoring unit 202 in FIG. 8. The correction symbol signals C(3)-C(19) of (iii) in FIG. 19 are the correction symbol signals outputted from the slip correction unit 203 and to which the phase correction was performed. Further, the graph α-12 in FIG. 19 shows the compensation amount of (i), the graph α-10 shows the correction amount applied to the primary compensation symbol signal of (ii), and the graph α-15 shows the correction amount of the phase applied to the correction symbol signal of (iii).

The correction amount of (i) in FIG. 19 outputted from the correction amount calculation unit 501 in FIG. 13 is transformed into a complex number (it is expressed as exp (−iB) when the correction amount of the phase is set to B). The product of the value of the complex number and the delay primary compensation symbol signal of (ii) is calculated and outputted as the correction symbol signal of (iii). That is, the compensation amount φ applied to the delay primary symbol signal H(7) at the time of 11T and the correction amount B (11) are summed, and the correction symbol C(12) to which the phase correction was performed is outputted at the time 12T. In FIG. 19, the correction amount is applied after α-16.

Figure 26:
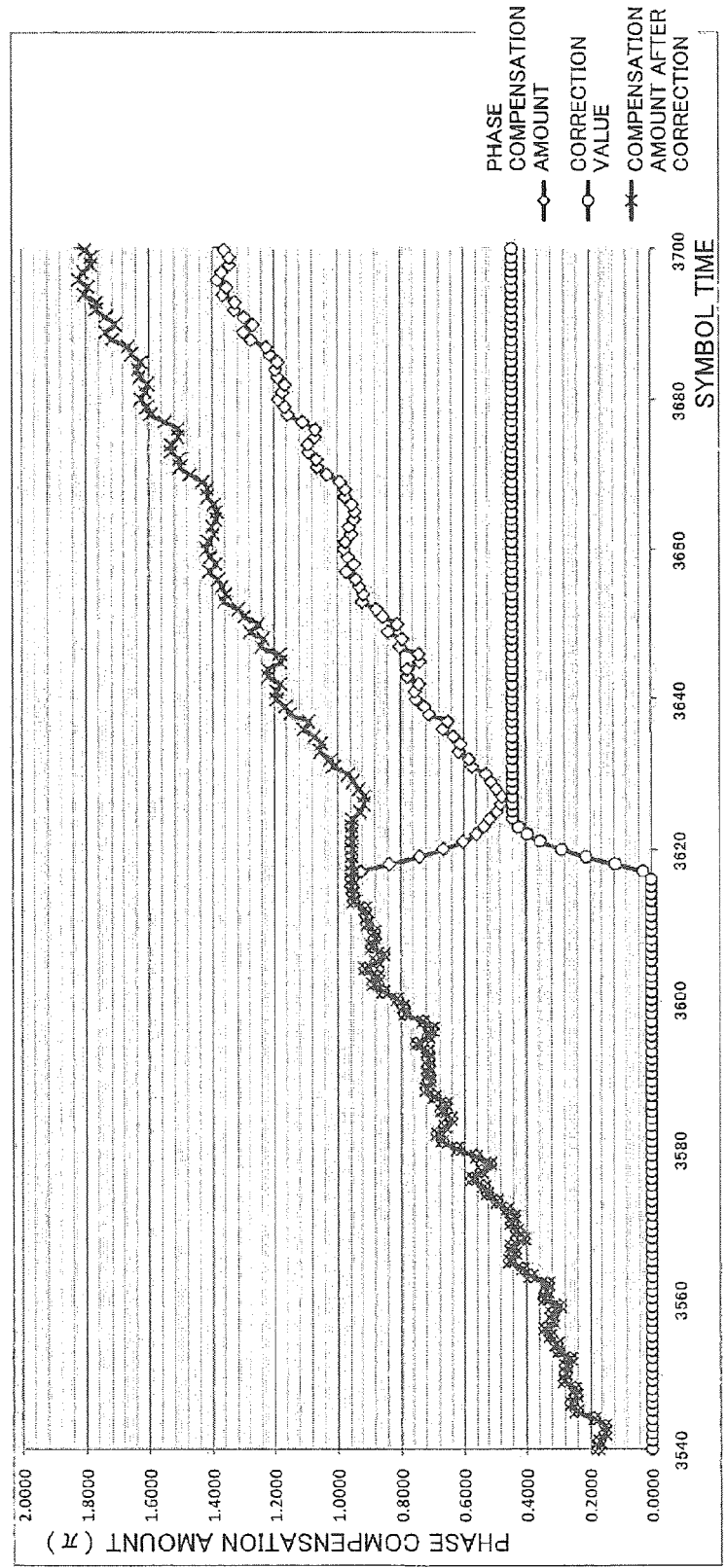
FIG. 26 is a diagram showing the phase corrected by the first exemplary embodiment.

FIG. 26 is a diagram showing the compensation amount of the phase after correction when the correction processing was performed n the actual measurement data based on an exemplary embodiment 1.

Thus, according to the above-mentioned exemplary embodiment, because the phase compensation amount from the compensation circuit unit 201 is monitored in the compensation amount monitoring unit 202, when a slip occurs, a change in the phase compensation amount by the slip can be corrected by the slip correction unit.

Further, in this exemplary embodiment, the accumulation unit 401 which accumulates the compensation change amount during K symbol time is provided in the compensation amount monitoring unit 202. Therefore, even when a slip occurs ranging over a plurality of symbol times, the abnormal change in the compensation amount by the slip can be detected, and the abnormal compensation amount can be corrected in the slip correction unit 203.

As described above, according to the present invention, it is possible to compensate a difference in the phase due to the slip without using differential coding, and the signal compensated by the expected value (α-4 of FIG. 14) of the phase compensation amount to the input symbol can be outputted.

Further, in the above-mentioned exemplary embodiment, in order to specify the slip occurrence point, a change in the compensation amount is monitored. However, an output signal (may be called a frequency offset amount) of the filter unit 102 shown in FIG. 10 may be used instead of the change in the compensation amount. Alternatively, a change in the output signal of the filter unit 102 along with the change in the compensation amount may be used.

According to the above-mentioned exemplary embodiment, although a phase compensation amount is reflected in an input signal in the compensation circuit unit, and the data thereof is outputted to the subsequent stage, a compensation amount by which slip cancellation is performed finally in the slip correction unit 203 may be applied.

Second Exemplary Embodiment

Figure 20:
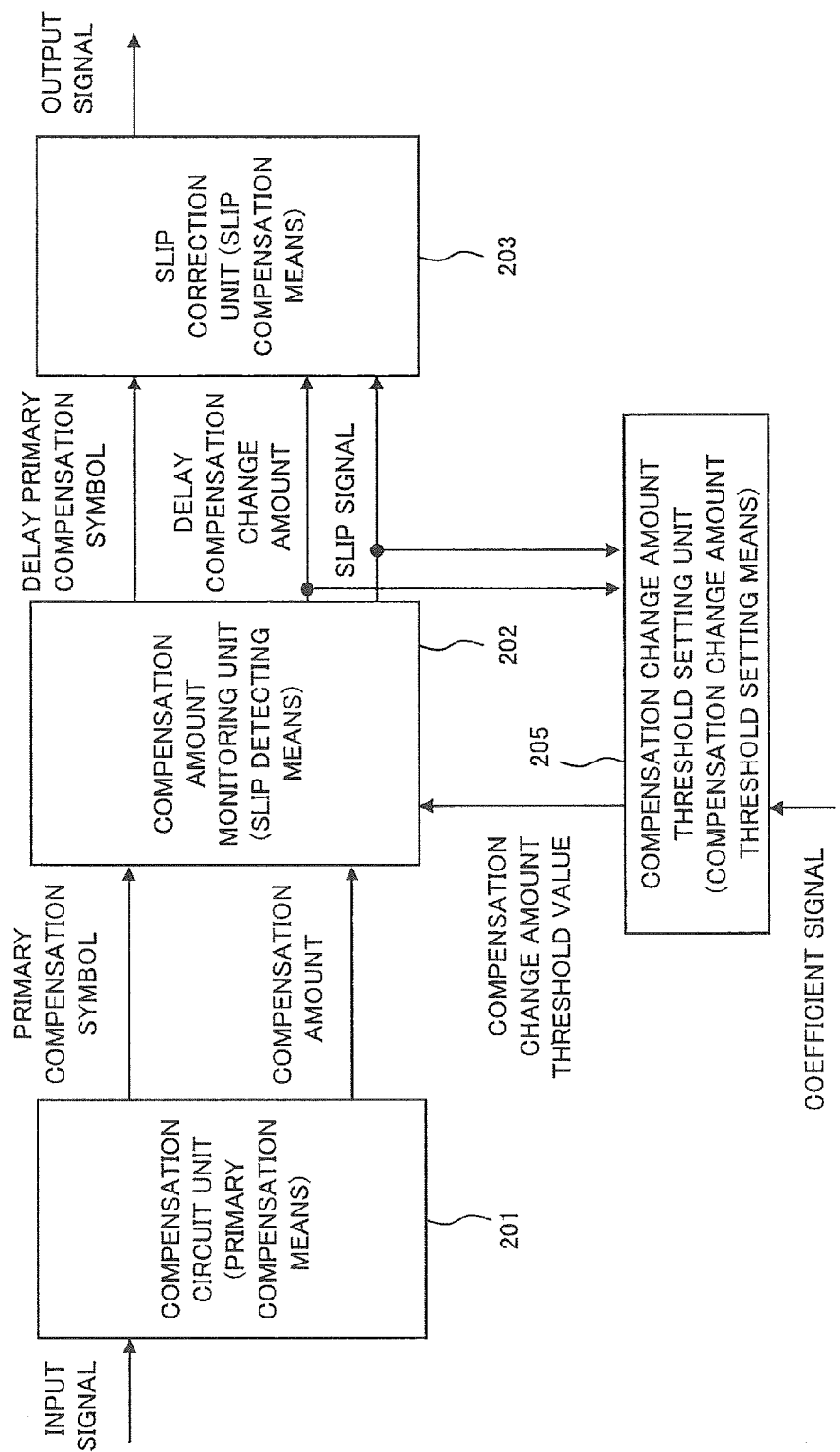
FIG. 20 is a diagram showing a configuration of a slip compensation circuit in a second exemplary embodiment.

As other exemplary embodiment of the present invention, although the basic configuration is as mentioned above, occurrence of a compensation change amount threshold value is further devised. The configuration is shown in FIG. 20. In FIG. 20, except that the compensation change amount threshold setting unit 204 shown in FIG. 8 was changed into a compensation change threshold decision unit 205, a compensation circuit unit 201, a compensation amount monitoring unit 202 and a slip correction unit 203 are the same configurations as the first exemplary embodiment shown in FIG. 8. The compensation change threshold decision unit 205 determines a compensation change threshold value used for detecting slip occurrence.

Figure 21:
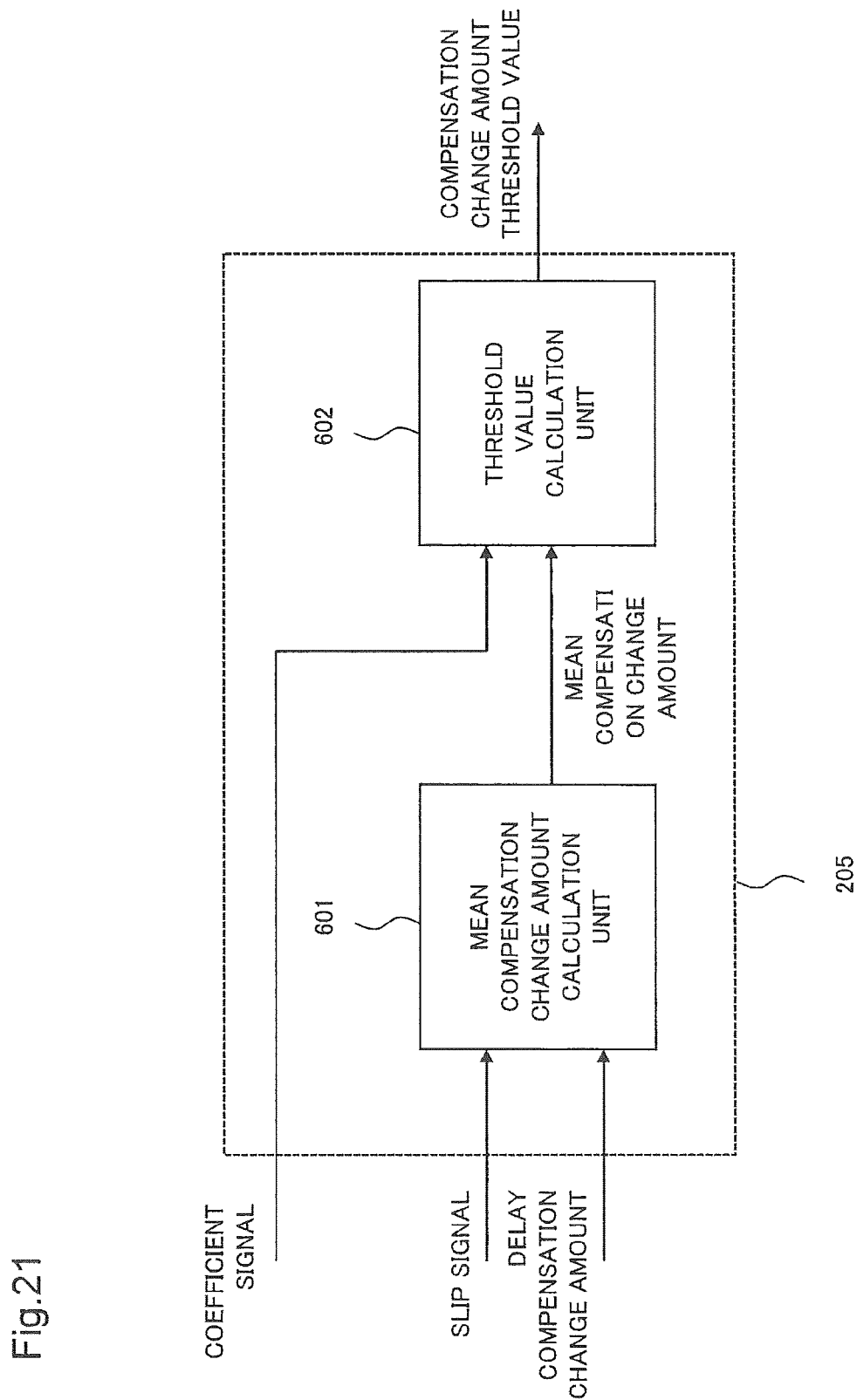
FIG. 21 is a diagram showing a configuration of a compensation change threshold decision unit 205 in the second exemplary embodiment.

Referring to FIG. 21, a configuration of the compensation change threshold decision unit 205 shown in FIG. 20 is shown. The compensation change threshold decision unit 205 includes a mean change amount calculation unit 601 and a threshold value calculation unit 602.

The mean change amount calculation unit 601 calculates a moving average of a delay compensation change amount and outputs the calculation result to the threshold value decision unit 602.

The threshold value decision unit 602 calculates a compensation change amount threshold value based on a mean compensation change amount. In this exemplary embodiment, as an example, the compensation change amount threshold value is calculated from the mean compensation change amount and a coefficient signal, and the compensation change amount threshold value is outputted to the compensation amount monitoring unit 202. Further, the coefficient signal although not shown, is connected to a control unit such as a CPU.

(Operation)

The delay compensation change amount and the slip signal are given to the mean change amount calculation unit 601 in FIG. 21 from the compensation amount monitoring unit 202. The mean change amount calculation unit 601 calculates the moving average of the delay compensation change amount of W symbol time only in case of "0" for value of the slip signal. The mean change amount calculation unit 601 outputs the calculation result to a threshold value decision unit 602 as the mean compensation change amount V. Because the moving average is calculated only in the case of "0" for the value of the slip signal, the compensation amount at the time of the slip occurrence is not included in this mean compensation change amount. It is because the case of "0" for the value of the slip signal is meant the state that a slip does not occur.

The mean compensation change amount V is given to the threshold value decision unit 602 from the mean compensation change amount calculation unit 601. The threshold value decision unit 602 multiplies the mean compensation change amount to K as shown in Formula (1) as an example, and outputs the value that is further multiplied thereto by a coefficient signal β as the compensation change amount threshold value th to the compensation amount monitoring unit 202. K is the accumulation symbol time in the accumulation unit 401 shown in FIG. 12, and the coefficient signal 13 shows a deviation ratio from the moving average. This coefficient signal β is set in order to adjust a value of the compensation change amount threshold value appropriately.

Compensation change amount threshold value
$$th = \text{Mean compensation change amount } V \times K \times \beta \quad (1)$$

Further, the compensation circuit unit 201, the compensation amount monitoring unit 202 and the slip correction unit 203 other than the above perform the same operation as the exemplary embodiment 1.

Thus, in this exemplary embodiment, the compensation change amount threshold value used for detecting occurrence of a slip is generated from the delay compensation change amount and the slip signal. Therefore, even when the compensation change amount changes, an appropriate compensation change amount threshold value can be obtained. For this reason, the effect that suppresses an error by a correction error is obtained.

Third Exemplary Embodiment

Figure 22:
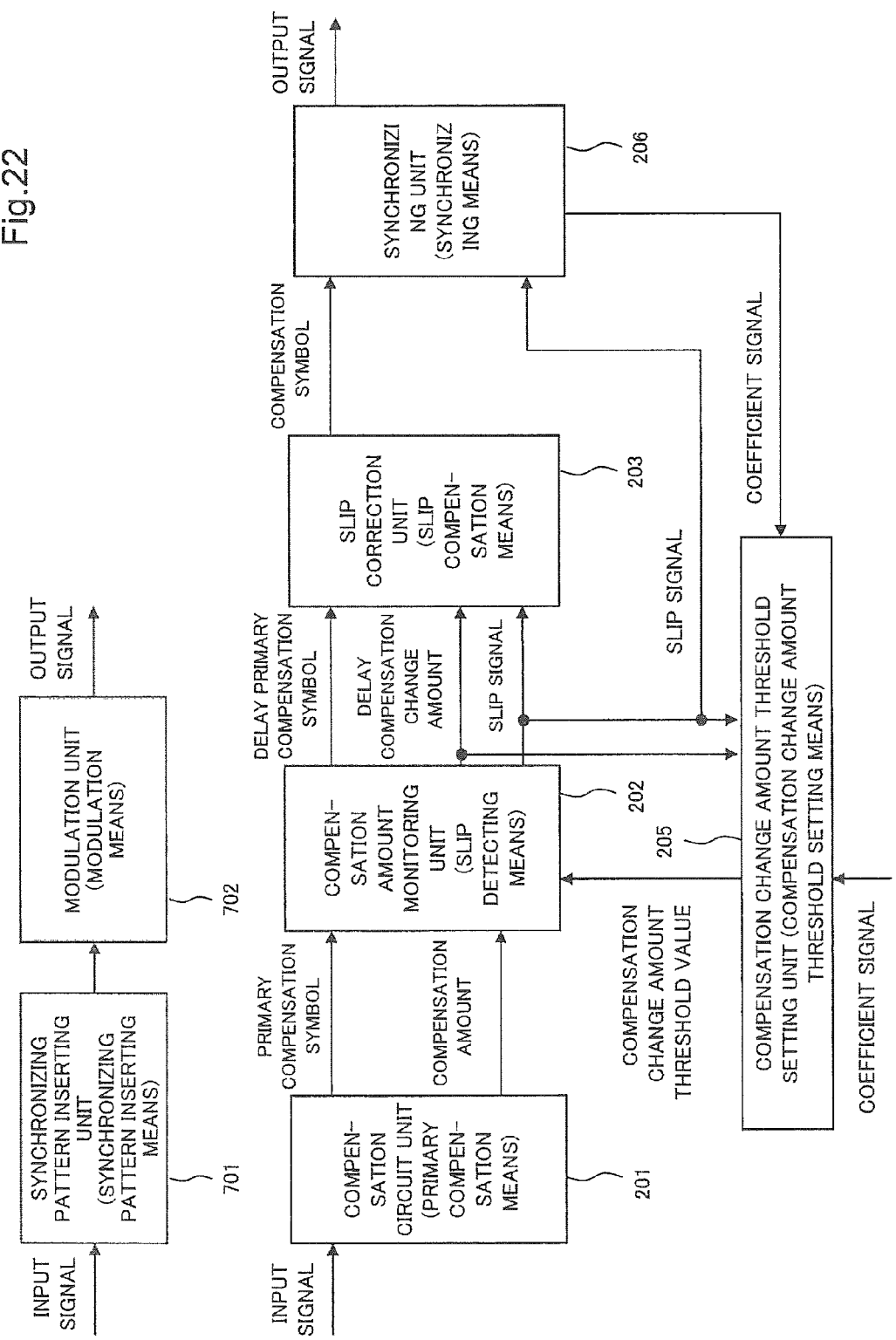
FIG. 22 is a diagram showing a configuration of a configuration of a slip compensation circuit in a third exemplary embodiment.

As other exemplary embodiments of the present invention, although the basic configuration is as mentioned above, occurrence of a compensation change amount threshold value is further devised. The configuration is shown in FIG. 22. In FIG. 22, it is the same configuration as the second exemplary embodiment shown in FIG. 20 but a synchronizing pattern insertion unit 701, a modulation unit 702 and a synchronizing unit 206 are added to the configuration of the exemplary embodiment 2 shown in FIG. 20.

The synchronizing pattern insertion unit 701 and the modulation unit 702 are arranged in a sending end, and an SD-FEC encode unit and a framer unit, although not shown, are arranged in an input side of the synchronizing pattern insertion unit.

The synchronizing pattern insertion unit 701 inserts a synchronizing pattern in an output data from the SD-FEC encode unit and outputs the result to the modulation unit 702.

The modulation unit 702 modulates data inputted from the synchronizing pattern insertion unit 701 and transmits to a receiving end.

In this exemplary embodiment, a modulation method is described about QPSK as an example, but not limited in particular. A circuit, although not shown, which demodulates a received signal is arranged between the modulation unit 702 and the compensation circuit unit 201.

The synchronizing unit 206 is connected to the slip correction unit 203, the compensation amount monitoring unit 202 and the compensation change amount decision unit 205. The synchronizing unit 206 detects a synchronizing pattern in a correction symbol signal and confirms the normality of a phase of the correction symbol signal. When synchronization loss is generated after the synchronizing pattern detection, the phase amount of the correction symbol signal is corrected once again depending on the state of the slip signal. The coefficient signal used when the compensation change amount threshold value is calculated is updated in the compensation change threshold decision unit 205. Further, description will be made later of a procedure in detail which updates the coefficient signal.

(Operation)

Next, operation of the synchronizing pattern insertion unit 701, the modulation unit 702 and the synchronizing unit 206 of the third exemplary embodiment shown in FIG. 22 will be described using FIG. 23, FIG. 24 and FIG. 25. Further, it will be the same operation as the second exemplary embodiment about operation in other configuration units.

Figure 23:
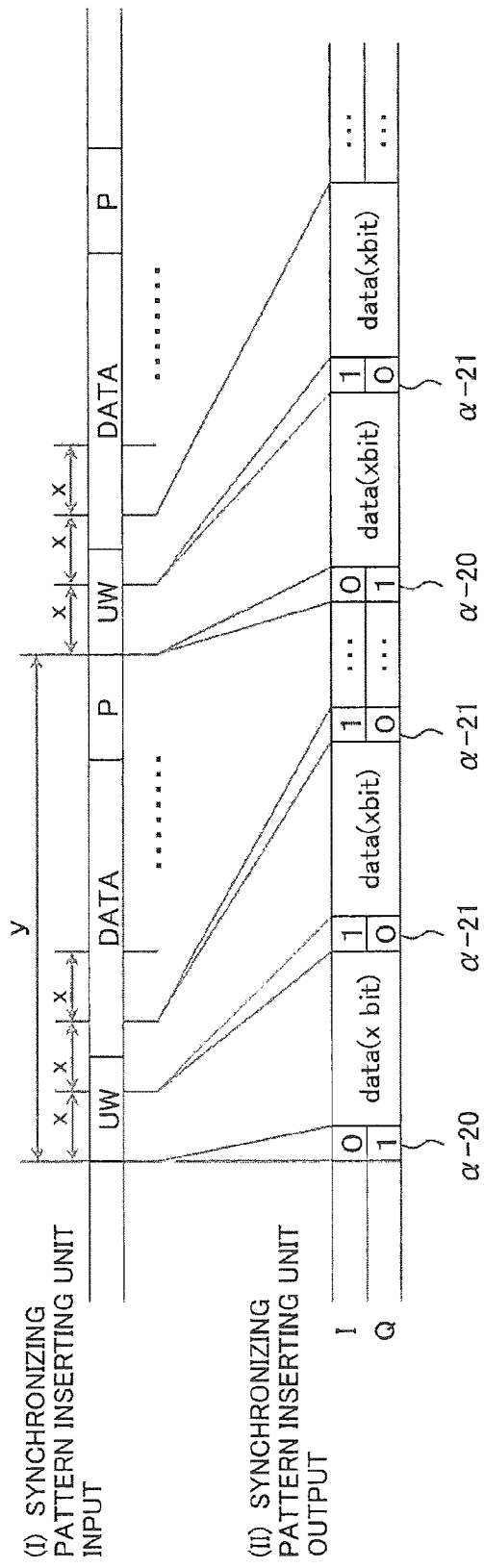
FIG. 23 is an example of the input and output data in a synchronizing pattern insertion unit 701 in the third exemplary embodiment.

FIG. 23 is a diagram showing an input signal and an output signal of the synchronizing pattern insertion unit 701 arranged in a sending end. (i) A synchronizing pattern insertion unit input is performed framing for each y bit in a framer unit and includes a parity calculated by the SD-FEC encode unit. A UW (Unique Word) is a header of a frame, and DATA is user data, and a parity value calculated by the SD-FEC encode unit is set to P. Further, in this exemplary embodiment, y bits is assumed to be 32768 bits (4096 bytes) as an example.

(ii) A synchronizing pattern insertion unit output is outputted by 2 bit width of I and Q. This is because the modulation method in the modulation unit 702 is QPSK. In this exemplary embodiment, the pattern inserted by the synchronizing pattern inserting unit is inserted according to the following conditions.

Condition 1: When the synchronizing pattern is initial data of UW, the synchronizing pattern is set "0" to I, and Q is set to "1", as the synchronizing pattern α-20. In case other than that, I is set to "1", and "0" to Q as th synchronizing pattern α-21.

In the synchronizing pattern insertion unit 701 in FIG. 22, when a synchronizing pattern insertion unit input of (i) in FIG. 23 is inputted, the synchronizing pattern insertion unit 701 separates an input signal from UW for every x bit, inserts a synchronizing pattern corresponding to the condition 1 for every x bit and outputs to the modulation unit 702. Here, x is a positive integer and is a divisor of y, and x bits is assumed to be 64 bits in this exemplary embodiment.

When a synchronizing pattern inserting unit output of (ii) in FIG. 23 is inputted to the modulation unit 702, the modulation unit 702 modulates the inputted I and Q, and transmits to a receiving end.

Thus, when the synchronizing pattern is inserted according to the condition 1 at the transmission side and is modulated, the synchronizing pattern appears for every 32 (x bits/2) symbol time for a received signal in the part in α-20 or α-21 shown in FIG. 23. The synchronizing pattern appears in the part shown in α-20 for every 256 (y/x/2) symbol time for a received signal.

Next, operation of the synchronizing unit 206 arranged in the receiving end will be described using FIG. 24 and FIG. 25. In both diagrams, correction symbol signals of (i) are diagrams which show the correction symbol signals outputted from the slip correction unit 203 by a complex number of I' and Q'. In both diagrams, synchronizing signals of (ii) show the synchronization state in the synchronizing unit 206, and the synchronization loss is generated at the part of α-18. In both diagrams, slip signals of (iii) are slip signals outputted from the compensation amount monitoring unit 202.

In both diagrams, re-correction symbol signals of (iv) are the corrected symbol signals I "and Q" outputted from the synchronizing unit 206. Coefficient signals β of (v) are signals outputted from the synchronizing unit 206 to the compensation change amount threshold decision unit 205 and are used for calculating a compensation change amount threshold value.

Figure 24:
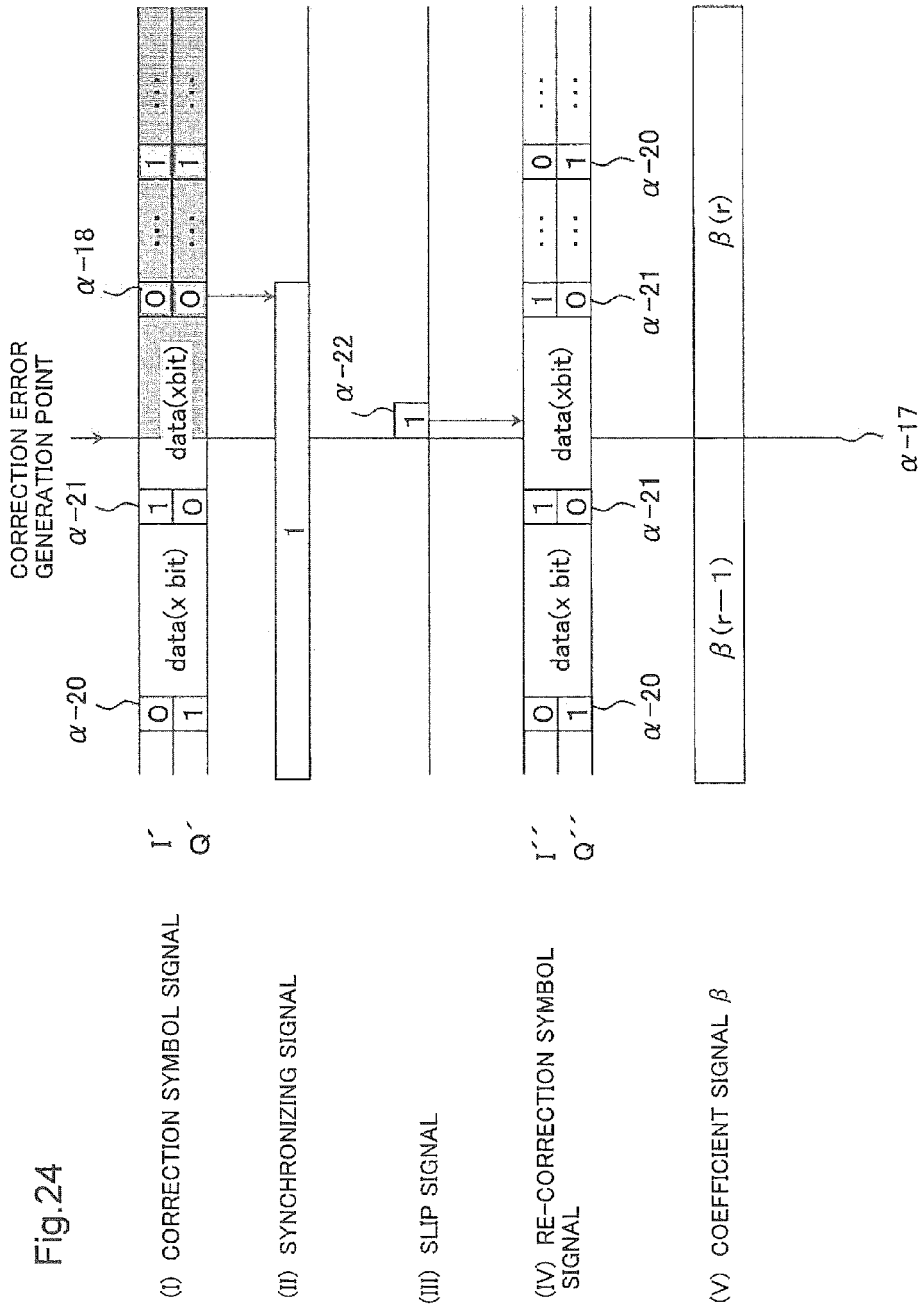
FIG. 24 is an example of the timing in a synchronizing unit 206 at the time of occurrence of miss correction at a pre-stage in the third exemplary embodiment.

Further, FIG. 24 is a diagram when the correction error is generated in the correction by the slip correction unit 203, and α-17 shows a part of the correction error. FIG. 25 is a diagram when the correcting cannot be finished in the slip correction unit 203, and a slip occurs somewhere after α-21 of the correction symbol signal of (i) in FIG. 25.

First, operation of the synchronizing unit 206 when a correction error has been generated, in the correction by the slip correction unit 203 will be described using FIG. 24.

When a correction symbol signal of (i) in FIG. 24 is inputted to the synchronizing unit 206 in FIG. 22, the synchronizing unit 206 detects a synchronizing pattern inserted in the synchronizing pattern insertion unit 701 from correction symbol signals (I' and Q') and generates a synchronization signal of (ii).

In FIG. 24, when synchronization loss occurs at a part of α-18, the synchronizing unit 206 re-corrects the correction symbol signal from the part α-22 in which a value of a slip signal just before the synchronization loss is "1". The correction amount can be made the difference with the synchronizing pattern.

A correction error which occurs because a threshold value of slip signal occurrence is not suitable can be prevented by raising a threshold value of slip signal occurrence more. Specifically, the value of coefficient signal β which is the coefficient of the threshold value of a slip signal occurrence is increased so that β(r−1)<β(r) may be set, the value of coefficient signal β is outputted to the compensation change amount threshold decision unit. The correction error is generated because the present compensation change amount threshold value th is low, and this is a processing for setting the compensation change amount threshold value th to an appropriate value. r is an arbitrary symbol time.

Next, operation of the synchronizing unit 206 when correction of a slip cannot be finished in the slip correction unit 203 will be described using FIG. 25.

Figure 25:
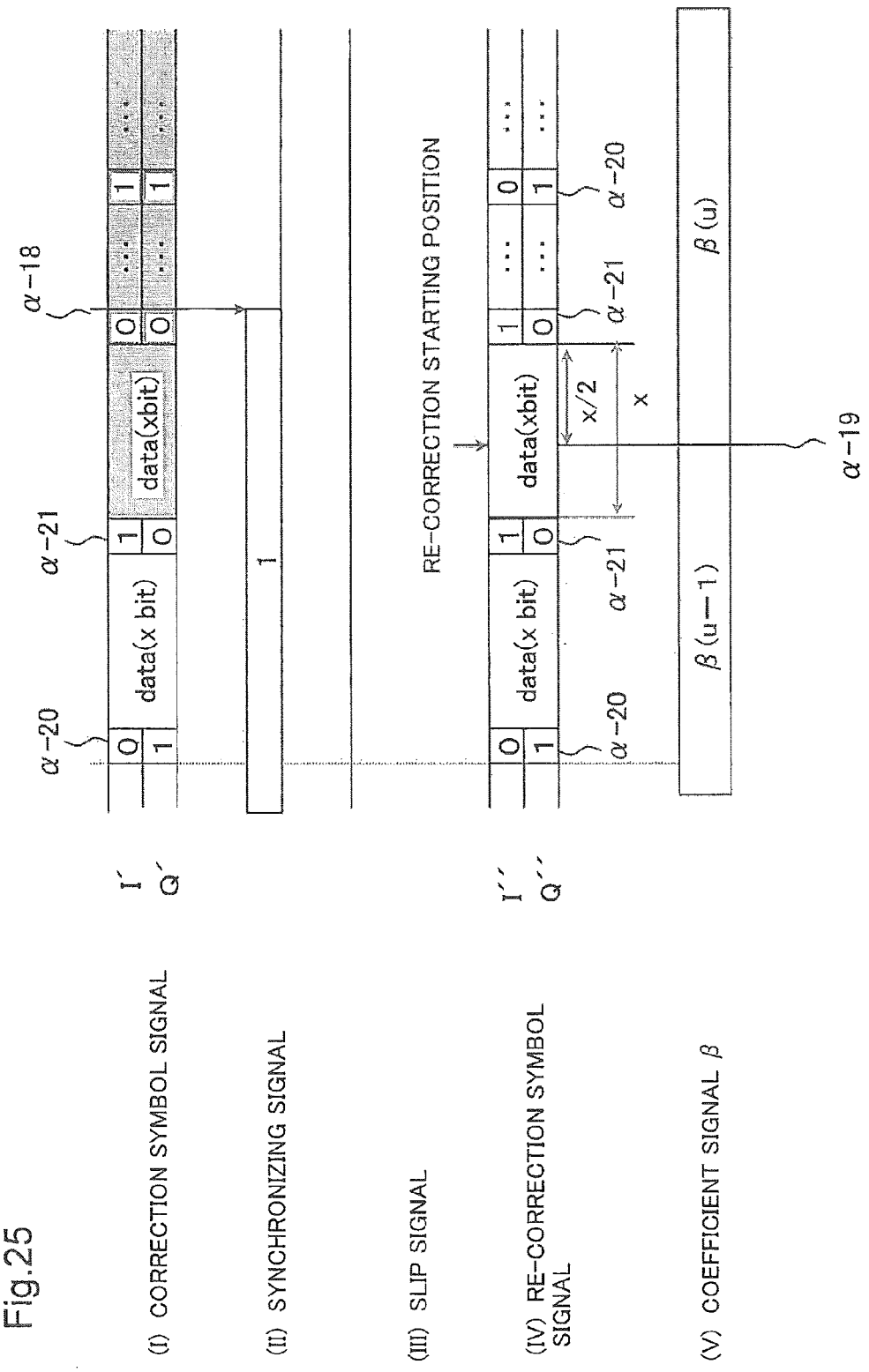
FIG. 25 is an example of the timing in the synchronizing unit 206 at the time of occurrence of non-correction at a pre-stage in the third exemplary embodiment.

When a correction symbol signal of (i) in FIG. 25 is inputted to the synchronizing unit 206 in FIG. 22, the synchronizing unit 206 detects a synchronizing pattern inserted in the synchronizing pattern insertion unit 701 from the correction symbol signal (I' and Q') and generates a synchronizing signal of (ii).

In FIG. 25, a synchronization loss occurs at the part of α-18. At that time, when the slip signal of (iii) in FIG. 25 is "0", the synchronizing unit 206 corrects the correction symbol signal from the part of (x bits/2=32 bits) which is a midway of the synchronizing pattern shown in α-19 of FIG. 25.

Because an occurrence point of a slip is unclear when a value of a slip signal is "0", a re-correction point of the slip needs to be determined. For this reason, in the processing mentioned above, it is assumed that a slip occurred once between the synchronizing patterns (x bits=64 bits), and an error by a slip is suppressed below 32 bits (x bits/2). The correction amount can be made the difference with the synchronizing pattern.

A correction error which occurs because a threshold value of slip signal occurrence is not suitable can be prevented by lowering a threshold value of slip signal occurrence more. Specifically, the synchronizing unit 206 decreases the value of coefficient signal β which is the coefficient of the threshold value of a slip signal occurrence so that the value of coefficient signal β may be set, and outputs to the compensation change threshold decision unit. It is because a correction error is generated according to the present compensation change amount threshold value th being large, and this is processing for making the compensation change amount threshold value th into a suitable value. u is an optional symbol time.

Thus, in this exemplary embodiment, the compensation change amount threshold value used for detecting occurrence of a slip is controlled by inserting the synchronizing pattern in the synchronizing pattern insertion unit 701 of the sending end, and by detecting the synchronizing pattern in the synchronizing unit 206. Specifically, the coefficient signal β for the compensation change amount threshold value is generated. Therefore, because false detection of a slip can be suppressed, the effect that improves the transmission characteristics can be obtained.

When a synchronization loss (slip occurrence) is detected in the synchronizing unit 206, re-correction according to the state of the slip signal can be performed. Accordingly, the error by mis-correction at the pre-stage can be suppressed, and the effect that improves the transmission characteristics is obtained.

(Effect)

The first effect is to be able to improve the transmission characteristic of the optical communication system by 3 dB. The reason is that it is possible to correct a difference in mapping due to the slip without using differential coding.

The second effect is to be able to improve the transmission characteristics of the optical communication system. The reason is that it is possible to realize calculation of LLR of SD-FEC which can expect high error correction gain without adding complicated processing because the differential coding is not used.

The third effect is to be able to improve the transmission characteristics of the optical communication system. The reason is because it is possible to suppress influence by a slip in the synchronizing pattern by detecting the synchronizing pattern inserted in the signal at the receiving end at the transmission side. That is, an error larger than the synchronizing pattern interval will not occur.

The fourth effect is to be able to improve the transmission characteristics of the optical communication system. The reason is to be able to detect the synchronizing pattern inserted in the signal at the transmission side at the receiving end, and change the compensation change amount threshold value which is a slip detection threshold value to an appropriate value by the number of slips that occurred between the synchronizing patterns. Accordingly, an error due to the slip can be suppressed.

Fourth Exemplary Embodiment

Figure 27:
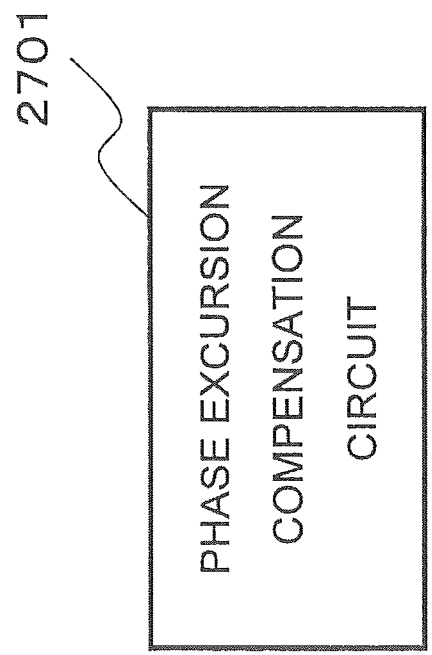
FIG. 27 is a diagram showing a fourth exemplary embodiment of the present invention.

A fourth exemplary embodiment of the present invention will be described with reference to FIG. 27.

A phase excursion compensation circuit 2701 of a phase modulation signal demodulator of this exemplary embodiment is characterized by detecting occurrence of a slip of a received signal from a change in a phase compensation amount performed by the phase excursion compensation circuit into the received signal, and correcting the phase compensation amount of the received signal after the slip occurrence.

By the above mentioned configuration, the phase excursion compensation circuit of the phase modulation signal demodulator of this exemplary embodiment has the following effect.

That is, when compensation processing of optical phase excursion and optical carrier wave frequency deviation is implemented, a slip compensating method (compensation method of optical phase excursion and optical carrier wave frequency deviation) which can demodulate transmit data correctly can be provided without deteriorating the transmission characteristic.

Fifth Exemplary Embodiment

As a fifth exemplary embodiment of the present invention, although the basic configuration is as described in the first exemplary embodiment, occurrence of a correction amount is further devised. Except that the slip correction unit 203 shown in FIG. 8 was changed to a slip correction unit 207, the configuration is the same configuration as the first exemplary embodiment shown in FIG. 8. Except that "mean compensation change amount" is applied to a correction amount calculated in the slip correction unit 203, the slip correction unit 207 is a block identical with the slip correction unit 203.

Figure 28:
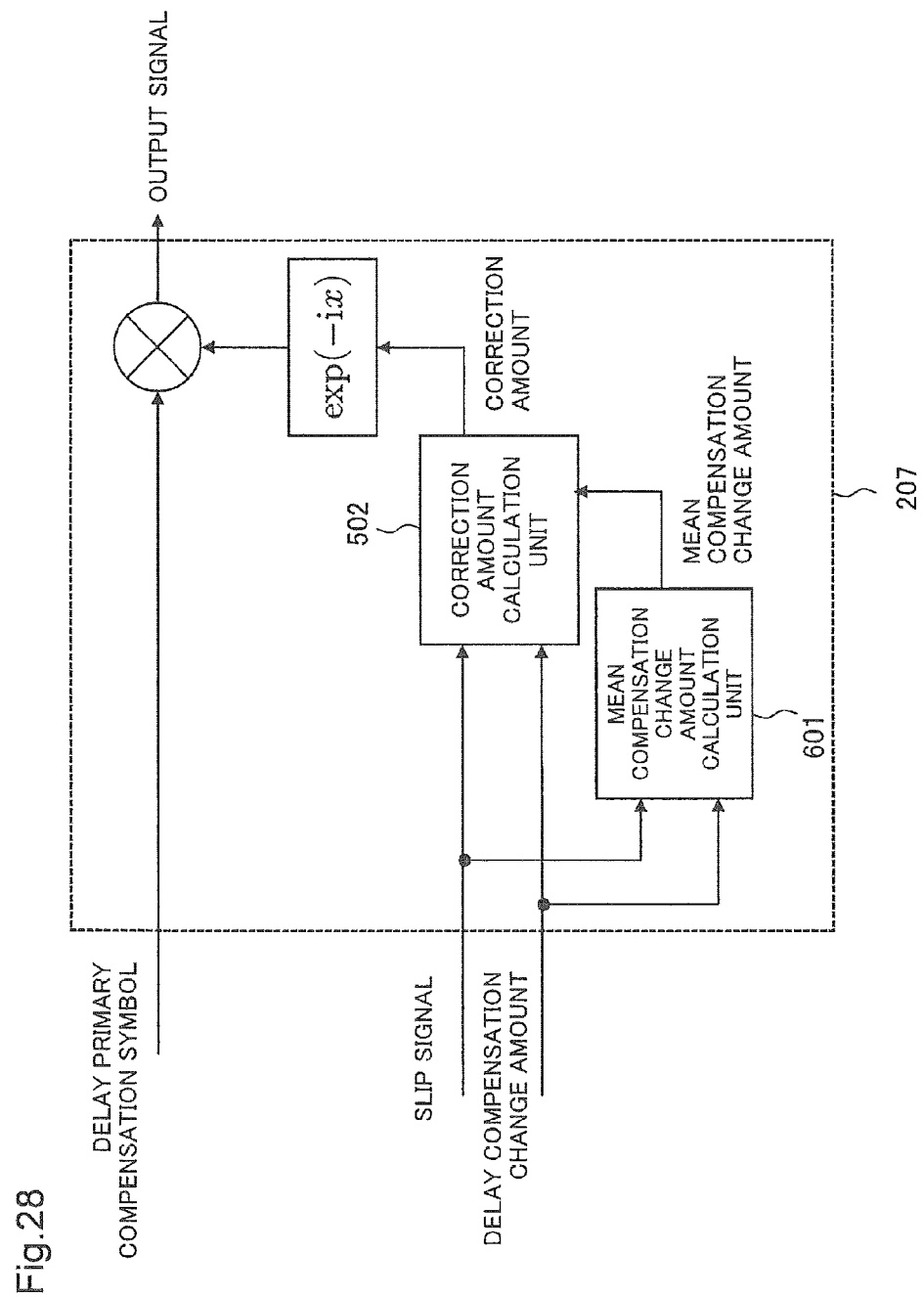
FIG. 28 is a block diagram showing a configuration of a slip correction portion 207 in a fifth exemplary embodiment.

Referring to FIG. 28, a configuration of the slip correction unit 207 shown in the diagram is shown. A mean compensation change amount calculation unit 601 calculates the moving average of the delay compensation change amount and outputs the moving average of the delay compensation change amount to a correction amount calculation unit 502.

The correction amount calculation unit 502 calculates a correction amount from a delay compensation change amount and a slip signal which are outputted from the compensation amount monitoring unit 202, and a mean compensation change amount from the mean compensation change amount calculation unit 601, and outputs. The correction amount calculated by the correction amount calculation unit 502 is transformed into a complex number (which is expressed by exp (−iφ) if the phase compensation amount is φ), and a product of the value of the complex number and the input signal is outputted as an output signal.

(Operation)

A delay compensation change amount and a slip signal from the compensation amount monitoring unit 202, and a mean compensation change amount from the mean compensation change amount calculation unit 601 are inputted to the correction amount calculation unit 502 in FIG. 28. Then, the correction amount calculation unit 502 does not perform summing of the delay compensation change amount and the correction amount when the value of the slip signal is "0" which shows non-occurrence of a phase slip, and outputs the correction amount 1 symbol time ago.

When the value of the slip signal is "1, the correction amount calculation unit 501 outputs, as the correction amount, the summation of the correction amount B (t), the delay compensation change amount D (t) and mean compensation change amount AVE (t) like the following Formula". t is an optional symbol time.

$$B(t+1)=B(t)+D(t)+AVE(t) \quad (2)$$

FIG. 29 is a diagram showing an output signal of the correction amount calculation unit 502 of this exemplary embodiment, and the delay primary compensation symbol signals H (−1)-H (15) of (i) in FIG. 29 is the output signal of the compensation amount monitoring unit 202 in FIG. 8. The correction symbol signals C(3)-C(19) of (ii) in FIG. 29 are correction symbol signals to which phase correction was performed and which are outputted from the slip correction unit 207. Further, the graph α-10 in FIG. 29 shows the compensation amount applied to a primary compensation symbol signal of (i).

And the graph α-15 shows the correction amount of the phase applied to the correction symbol signal in the first exemplary embodiment. The graph α-17 shows the correction amount applied to the correction signal in this exemplary embodiment. In α-18-20 of FIG. 29, the correction value generated by the above-mentioned Formula (2) is applied.

Further, the compensation circuit unit 201, the compensation amount monitoring unit 202 and the compensation change amount threshold setting unit 204 other than the above perform the same operation as the first exemplary embodiment. The mean compensation change amount calculation unit 601 performs the same operation as the second exemplary embodiment.

Thus, while the correction amount which cancels the compensation amount at the time of the slip occurrence was generated in the first exemplary embodiment, this exemplary embodiment is different in the following point. In this exemplary embodiment, in order to sum a mean compensation change amount to the canceled compensation amount, a correction amount which considered the change amount that should be increased (or decreased) at the time of slip occurrence is generated. For this reason, the effect that suppresses a difference in the phases due to the slip occurrence is obtained.

In addition, in each of the exemplary embodiments having been described so far, a dedicated apparatus is supposed, but the following type of apparatus is sufficient. That is, for example, boards, cards or the like necessary for performing processes corresponding to the processes of the above-described exemplary embodiments are installed in a personal computer apparatus capable of performing various data processes, and the individual processes are performed under the control of the computer apparatus side. In this way, a configuration may be made such that software for executing the processes are installed into the personal computer apparatus, and are executed.

The software installed into a data processing apparatus such as the personal computer apparatus may be distributed via various types of recording (storage) medium, such as an optical disk or a memory card, or may be distributed via a communication means, such as the Internet.

The aforementioned exemplary embodiments may be each combined with any ones of the other exemplary embodiments.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application claims priority based on Japanese Patent Application No. 2011-067699, filed on Mar. 25, 2011, the disclosure of which is hereby incorporated by reference in its entirety.

The whole or part of the exemplary embodiments disclosed above can be described as, but not limited to, the following supplementary notes.
(Supplementary Note 1)
A phase excursion compensation circuit of a phase modulation signal demodulator characterized in that
the phase excursion compensation circuit detects occurrence of a slip of a received signal from a change in a phase compensation amount performed to the received signal by a phase excursion compensation means, and corrects the phase compensation amount of the received signal after occurrence of the slip.
(Supplementary Note 2)
A phase excursion compensation circuit of a phase modulation signal demodulator comprising:
 a phase compensation means for compensating a phase excursion to an input signal;
 a slip detection means for monitoring a change in a phase compensation amount in the phase compensation means and detecting occurrence of a slip; and
 a slip correction means for correcting a phase change amount caused by the slip detected by the slip detection means.
(Supplementary Note 3)
The phase excursion compensation circuit of the phase modulation signal demodulator according to Supplementary Note 2, wherein the occurrence of the slip is detected when a phase compensation change amount in the phase compensation means exceeds a predetermined threshold value.
(Supplementary Note 4)
The phase excursion compensation circuit of the phase modulation signal demodulator according to Supplementary Note 3, wherein the threshold value is set based on a moving average of the phase compensation change amount.
(Supplementary Note 5)
The phase excursion compensation circuit of the phase modulation signal demodulator according to any one of Supplementary Note 1 to 4, comprising a synchronizing means for detecting a synchronizing pattern inserted in a received signal and re-correcting the phase compensation amount.
(Supplementary Note 6)
The phase excursion compensation circuit of the phase modulation signal demodulator according to Supplementary Note 5, wherein the synchronizing pattern has a different pattern in a head of a frame from other positions of the frame.
(Supplementary Note 7)
The phase excursion compensation circuit of the phase modulation signal demodulator according to any one of Supplementary Note 1 to 6, wherein the phase excursion compensation circuit further performs compensation of a carrier frequency deviation.
(Supplementary Note 8)
An optical transmission receiver comprising a phase excursion compensation circuit of the phase modulation signal demodulator according to any one of Supplementary Note 1 to 7.
(Supplementary Note 9)
An optical transmission communication system comprising an optical transmission receiver according to any one of Supplementary Note 1 to 8.
(Supplementary Note 10)
A phase excursion compensation method comprising:
detecting occurrence of a slip of a received signal from a change in a phase compensation amount of the received signal; and
correcting the phase compensation amount of the received signal after the occurrence of the slip.
(Supplementary Note 11)
A phase excursion compensation method comprising:
 compensating a phase excursion to an input signal;
 monitoring a change in a phase compensation amount and detecting occurrence of a slip; and
 correcting the phase change amount caused by the slip.
(Supplementary Note 12)
The phase excursion compensation method according to Supplementary Note 1, wherein the slip is detected when a phase compensation change amount in the phase compensation means exceeds a predetermined threshold value.
(Supplementary Note 13)
The phase excursion compensation method according to Supplementary Note 12, wherein the threshold value is set based on a moving average of the phase compensation change amount.
(Supplementary Note 14)
The phase excursion compensation method according to either of Supplementary Note 10 to Supplementary Note 13, wherein
a synchronizing pattern inserted in a received signal is detected, and the phase compensation amount is re-corrected.
(Supplementary Note 15)
The phase excursion compensation method according to Supplementary Note 14, wherein
the synchronizing patter has a different pattern in a head of a frame and other positions of the frame.
(Supplementary Note 16)
A phase excursion compensation program for making a computer executes processing comprising:
 phase compensation processing for compensating a phase excursion to an input signal;
 slip detection processing for monitoring a change in a phase compensation amount in the phase compensation processing and detecting occurrence of a slip; and
 slip correction processing for correcting a phase change amount caused by the slip detected by the slip detection processing.

INDUSTRIAL APPLICABILITY

The present invention relates to a receiver for performing compensation of optical phase excursion and optical carrier wave frequency deviation, and in particular, relates to compensation of frequency phase excursion and carrier wave frequency deviation at the time of cycle (the phase) slip occurrence, and has the availability on the industry.

REFERENCE SIGN LIST 101 phase error detection unit
102 filter unit
103 phase compensation amount calculation unit
104 differential decoding unit
201 compensation circuit unit (optical phase excursion and optical carrier wave frequency deviation compensation circuit)
202 compensation amount monitoring unit
203 slip correction unit
204 compensation change amount threshold setting unit
205 compensation change amount threshold decision unit
206 synchronizing unit
207 slip correction unit
301 symbol time delay unit
302 compensation change amount detection unit
303 compensation change amount comparison unit
304 symbol timing adjustment unit
401 accumulation unit
402 comparison unit
403 delay unit
501 correction amount calculation unit
502 correction amount calculation unit
601 mean compensation change amount calculation unit
602 threshold value calculation unit
701 synchronizing pattern inserting unit
702 modulation unit

The invention claimed is:

1. A phase excursion compensation circuit of a phase modulation signal demodulator, the phase excursion compensation circuit comprising:
a phase compensation unit for compensating a phase excursion to an input signal;
a slip detection unit including an accumulation unit calculating an accumulated value of a compensation change amount by adding a change in a phase compensation amount in the phase compensation unit and a comparison unit detecting an occurrence of a slip by comparing the accumulated value of the compensation change amount with a predetermined threshold value; and
a slip correction unit for correcting a phase change amount caused by the slip detected by the slip detection unit.

2. The phase excursion compensation circuit of the phase modulation signal demodulator according to claim 1, wherein the occurrence of the slip is detected when the accumulated value of the compensation change amount in the phase compensation unit exceeds the predetermined threshold value.

3. The phase excursion compensation circuit of the phase modulation signal demodulator according to claim 2, wherein the threshold value is set based on a moving average of the accumulated value of the compensation change amount.

4. The phase excursion compensation circuit of the phase modulation signal demodulator according to claim 1, further comprising a synchronizing unit for detecting a synchronizing pattern inserted in a received signal and re-correcting the phase compensation amount.

5. The phase excursion compensation circuit of the phase modulation signal demodulator according to claim 4, wherein the synchronizing pattern has a different pattern in a head of a frame from other positions of the frame.

6. The phase excursion compensation circuit of the phase modulation signal demodulator according to claim 1, wherein the phase excursion compensation circuit further performs compensation of a carrier frequency deviation.

7. An optical transmission receiver comprising a phase excursion compensation circuit of the phase modulation signal demodulator according to claim 1.

8. An optical transmission communication system comprising an optical transmission receiver according to claim 7.

9. The phase excursion compensation circuit of the phase modulation signal demodulator according to claim 1, wherein the slip correction unit comprises a correction amount calculation unit, and
wherein a correction amount calculated by the correction amount calculation unit is transformed into a complex number and a product of a value of the complex number and the input signal is outputted as an output signal.

10. A phase excursion compensation method, comprising:
adding a phase compensation amount to compensate a phase excursion to an input signal;
detecting an occurrence of a slip by monitoring an accumulated value of a change in the phase compensation amount; and
correcting the phase change amount caused by the slip.

11. The phase excursion compensation method according to claim 10, wherein the slip is detected when the change in the phase compensation amount exceeds a predetermined threshold value.

12. The phase excursion compensation method according to claim 11, wherein the threshold value is set based on a moving average of the change in the phase compensation amount.

13. The phase excursion compensation method according to claim 10, further comprising:
detecting a synchronizing pattern inserted in a received signal; and
re-correcting the phase compensation amount.

14. The phase excursion compensation method according to claim 13, wherein the synchronizing patter has a different pattern in a head of a frame and other positions of the frame.

15. The phase excursion compensation method according to claim 10, wherein said detecting the occurrence of the slip comprises comparing the accumulated value of the change in the phase compensation change with a predetermined threshold value.

16. The phase excursion compensation method according to claim 10, wherein said correcting the phase change amount comprises transferring a correction amount into a complex number; and
outputting a product of a value of the complex number and the input signal as an output signal.

17. A non-transitory computer-readable storage medium tangibly embodying a phase excursion compensation program for making a computer execute:
adding a phase compensation amount to compensate a phase excursion to an input signal;
detecting an occurrence of a slip by monitoring an accumulated value of a change in the phase compensation amount; and
correcting the phase change amount caused by the slip.

18. The non-transitory computer-readable storage medium according to claim 17, wherein said detecting the occurrence of the slip comprises comparing the accumulated value of the change in the phase compensation change with a predetermined threshold value.

* * * * *